United States Patent
Wang et al.

(10) Patent No.: US 11,900,686 B1
(45) Date of Patent: Feb. 13, 2024

(54) ARTIFICIAL INTELLIGENCE (AI) MODELS TO IMPROVE IMAGE PROCESSING RELATED TO PRE AND POST ITEM DELIVERIES

(71) Applicant: Amazon Technologies, Inc., Seattle, WA (US)

(72) Inventors: Zheshen Wang, Bellevue, WA (US); Dimitris Papadimitriou, Berkeley, CA (US); Mehran Kafai, Bellevue, WA (US); Jarrod Sherwin, Kent, WA (US); Anthony Sharma, Kenmore, WA (US)

(73) Assignee: Amazon Tecnologies, Inc., Seattle, WA (US)

( * ) Notice: Subject to any disclaimer, the term of this patent is extended or adjusted under 35 U.S.C. 154(b) by 459 days.

(21) Appl. No.: 17/089,269

(22) Filed: Nov. 4, 2020

(51) Int. Cl.
*G06V 20/56* (2022.01)
*G06T 11/00* (2006.01)
(Continued)

(52) U.S. Cl.
CPC .......... *G06V 20/56* (2022.01); *G06F 18/2148* (2023.01); *G06F 18/21355* (2023.01);
(Continued)

(58) Field of Classification Search
CPC .......... G06N 20/00; G06T 2207/20081; G06T 2207/20084; G06T 7/70; G06T 2207/30242; G06T 7/73; G06T 2207/30184; G06T 2200/24; G06T 2210/12; G06T 7/0002; G06T 11/00; G06T 2207/30168; G06T 2207/10004; G06T 2207/10016; G06T 2211/428; G06V 10/454; G06V 10/70; G06V 10/774; G06V 10/82; G06V 10/764; G06V 30/19173; G06V 10/22; G06V 10/225; G06V 10/23; G06V 10/255; G06V 10/765; G06V 10/87; G06V 10/7715; G06V 30/19127; G06V 10/7747; G06V 30/19147; G06V 10/40; G06V 10/44; G06V 20/56; G06V 10/424; G06V 10/426; G06V 10/25; G06V 20/176; G06V 20/38; G06V 20/39; G06V 10/993; G06V 20/50; G06K 9/6256; G06K 9/628; G06K 9/6279; G06K 9/6227;
(Continued)

(56) References Cited

U.S. PATENT DOCUMENTS 10,262,290 B1 * 4/2019 Mossoba ................ G06N 20/00
2018/0121875 A1 5/2018 Satyanarayana Rao et al.
(Continued)

*Primary Examiner* — Sumati Lefkowitz
*Assistant Examiner* — Michael Adam Shariff
(74) *Attorney, Agent, or Firm* — Kilpatrick Townsend & Stockton LLP

(57) ABSTRACT

Techniques for improving image processing related to item deliveries are described. In an example, a computer system receives an image showing a drop-off of an item, the item associated with a delivery to a delivery location. The computer system inputs the image to a first artificial intelligence (AI) model. The computer system receives first data comprising an indication of whether the drop-off is correct from the first AI model. The computer system causes a presentation of the indication at a device associated with the delivery of the item to the delivery location.

20 Claims, 20 Drawing Sheets

(51) Int. Cl.
   *G06N 20/00*      (2019.01)
   *G06T 7/00*       (2017.01)
   *G06Q 10/083*     (2023.01)
   *G06F 18/214*     (2023.01)
   *G06F 18/2431*    (2023.01)
   *G06F 18/2135*    (2023.01)

(52) U.S. Cl.
   CPC ......... *G06F 18/2431* (2023.01); *G06N 20/00* (2019.01); *G06Q 10/0838* (2013.01); *G06T 7/0002* (2013.01); *G06T 11/00* (2013.01); *G06T 2207/30168* (2013.01); *G06T 2210/12* (2013.01)

(58) Field of Classification Search
   CPC .. G06K 9/6267; G06K 9/6248; G06K 9/6257; G06K 9/00523; G06Q 10/0833; G06Q 10/08; G06Q 10/0838; G06Q 10/08355
   See application file for complete search history.

(56) References Cited

U.S. PATENT DOCUMENTS

| | | |
|---|---|---|
| 2019/0050805 A1 | 2/2019 | Munafo et al. |
| 2022/0083964 A1* | 3/2022 | Silverstein ......... G06Q 30/0282 |

* cited by examiner

ARTIFICIAL INTELLIGENCE (AI) MODELS TO IMPROVE IMAGE PROCESSING RELATED TO PRE AND POST ITEM DELIVERIES

CROSS-REFERENCE TO RELATED APPLICATIONS

This application is related to and incorporates by reference for all purposes the full disclosure of U.S. patent application Ser. No. 17/089,189, filed on Nov. 4, 2020, titled "ARTIFICIAL INTELLIGENCE (AI) MODELS TO IMPROVE IMAGE PROCESSING RELATED TO ITEM DELIVERIES".

BACKGROUND

Different computing services are available to improve the user experience with item deliveries. For instance, a driver can receive a map of the delivery location on their device. Also, the driver can take an image of an item that is dropped off at a delivery location. The image taken by the driver can also be sent to a device of a user that is associated with the delivery location.

BRIEF DESCRIPTION OF THE DRAWINGS

Various embodiments in accordance with the present disclosure will be described with reference to the drawings, in which.

DETAILED DESCRIPTION

Figure 1:
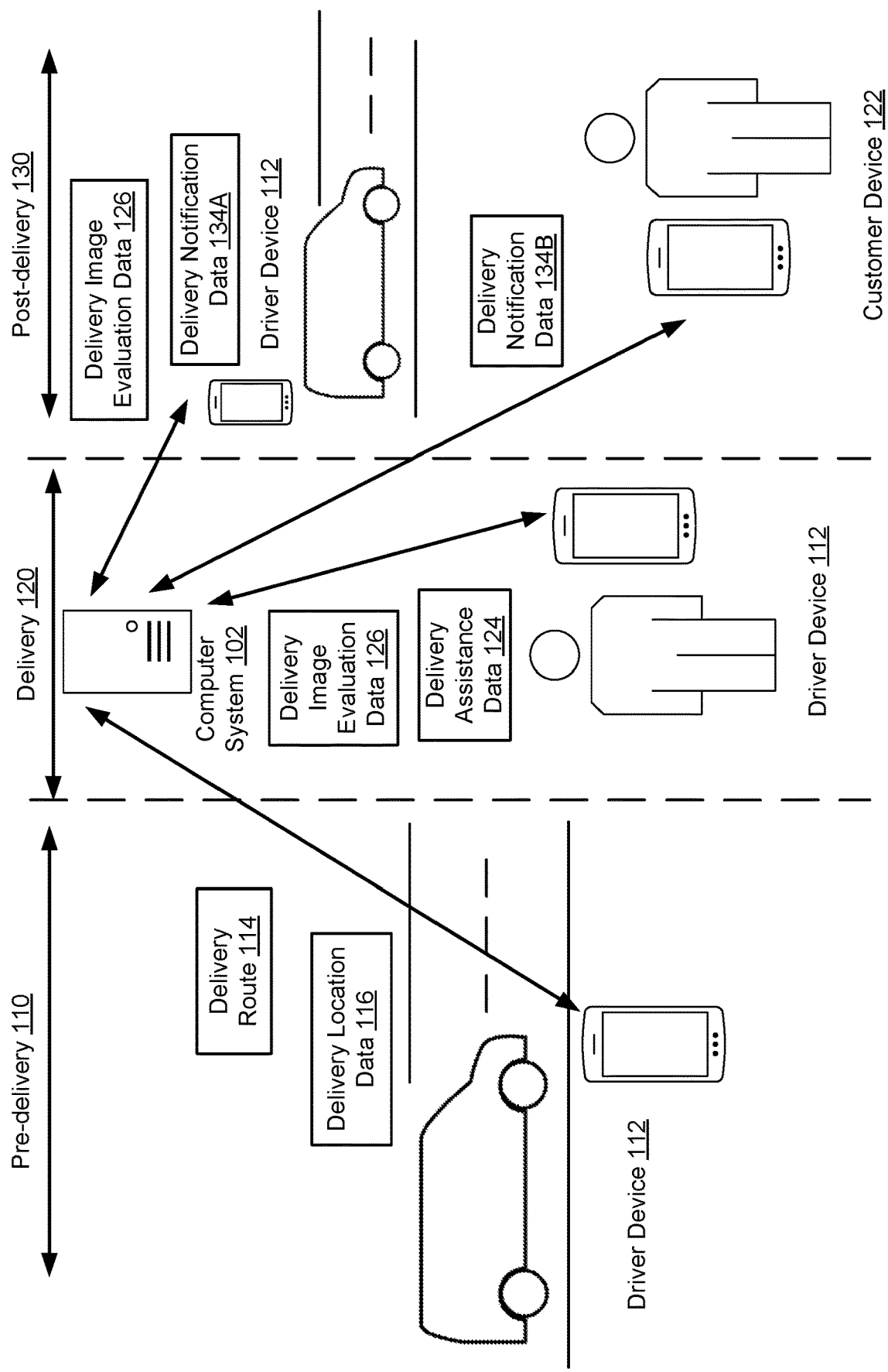
FIG. 1 illustrates an example of a system performing delivery-related image processing, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques to improve image processing related to item deliveries. In an example, a computer system inputs images showing item drop-offs at a delivery location to an artificial intelligence (AI) model, such as an ML model trained for object detection, and receives, from the AI model, data identifying objects at the delivery location, relative positioning of the object, and a correct drop-off location. The computer system sends the data to a device associated with a delivery of an item to the delivery location. The computer system also receives image data showing a portion of the delivery location. Using another AI model associated with the delivery location, such as a binary classifier trained using at least images specific to the delivery location, the computer system receives an indication from this AI model of whether the portion corresponds to a correct drop-off location. The computer system causes a presentation about the indication to be provided at a device, such as in an overlay over the image data on a display of the device. Upon a drop-off, an image of the drop-off is input to yet another AI model also associated with the delivery location, such as a multi-class classifier trained using at least images specific to the delivery location and to neighboring delivery locations. The computer system receives an output of this AI model, where the output indicates whether the drop-off was correct. This output may be presented on the display of the device. The computing system additionally receives an image quality evaluation of the image from another AI model, such as image scoring machine learning (ML) model, and sends the image quality evaluation to the device.

To illustrate, consider an example of a delivery driver delivering items along a route. Using one or more of the above AI models, a computer system provides multiple computing services by sending data to a device of the delivery driver. For instance, the computer system can provide a delivery route and delivery location data to the device of the delivery driver prior to the driver delivering items. The delivery route includes delivery locations for items to be delivered. The delivery location data includes data identifying objects at a particular delivery location. For example, the delivery location data indicates a correct drop-off location is on a doormat behind a plant. The delivery location data also includes a safety warning associated with the correct drop-off location based on environmental data associated with the drop-off location. For example, the delivery location data indicates "watch for ice on steps" upon determining the temperature is below freezing. During drop-off of the item, the device of the delivery driver receives delivery assistance data from the computer system. The delivery driver uses a camera of the device to scan the delivery location. When the image data indicates the camera is scanning a portion of the delivery location that corresponds to the correct drop-off location, an indication of the correct drop-off location (e.g., "correct drop-off location") is presented as an overlay over the image data at the device.

The delivery driver takes an image of the item at the delivery location during drop-off. If the computer system determines the item was delivered to an incorrect delivery location, the device of the delivery driver receives delivery notification data indicating the item was delivered to an incorrect delivery location from the computer system. Another device associated with the correct delivery location (e.g., a device of a user at that location) or the incorrect delivery location (e.g., a device of another user at that location) may also receive the delivery notification data. The image is also processed to determine delivery image evaluation data. The delivery image evaluation data indicates a quality (e.g., good or poor) of the image to the device. The delivery image evaluation data may also include suggestions for image improvement (e.g., "hold device still", "zoom out", "hold device upright).

Embodiments of the present disclosure provide various technological advantages over a conventional computer system. For example, the conventional computer system may provide delivery location data indicating a correct delivery location. In comparison, the embodiments provide multiple computing services, some of which can be implemented in real-time, by processing image data. Prior to a delivery, specific delivery instructions are provided to a device to assist a delivery driver and, as needed, improve safety given particular environmental condition. During the delivery, the device receives real-time feedback of a correct drop-off location at the delivery location or of image quality associated with an image taken of the drop-off location. Accordingly, the amount of incorrectly delivered items and poor quality images are reduced. In-real-time or shortly after occurrence of a drop-off, an evaluation of whether the drop-off was correct is performed and, in case of an incorrect drop-off, the incorrect delivery location is identified such that a corrective action can be taken immediately. As a result, the amount of processing and resources to recover incorrectly delivered items are reduced.

FIG. 1 illustrates an example of a system performing delivery-related image processing, according to embodiments of the present disclosure. Item delivery involves multiple stages, such as pre-delivery 110 (e.g., prior to items being delivered), delivery 120 (e.g., as items are being dropped off), and post-delivery 130 (e.g., after items are delivered). As further illustrated in the next figures, the processing can be performed, at least in part, in connection with a computer system 102, such as a backend server or a cloud computing service.

As illustrated, a delivery driver delivers items along a route. Using one or more AI models, the computer system 102 provides multiple computing services by sending data to a driver device 112 associated with the delivery driver. For instance, the computer system 102 can provide a delivery route 114 and delivery location data 116 to the driver device 112 during pre-delivery 110. The delivery location data 116 is determined by a machine-learning (ML) model running on the computer system 102. The ML model can alternatively be downloaded to the driver device 112 from the computer system 102 to determine the delivery location data 116. The delivery route 114 includes delivery locations for items to be delivered. The delivery locations may be defined using street addresses. The delivery location data 116 includes data identifying objects at a particular delivery location. For example, the delivery location data 116 indicates a correct drop-off location is on a doormat behind a plant. A drop-off location is a location within a delivery location where an item is to be dropped-off. The drop-off location can be defined in the delivery location data 116 by a description, a bounding box in an image, or other data. The delivery location data 116 also includes a safety warning associated with the correct drop-off location based on environmental data associated with the drop-off location. For example, the delivery location data 116 indicates "watch for ice on steps" upon determining the temperature is below freezing.

During delivery 120 of the item, the driver device 112 receives delivery assistance data 124 from another ML model associated with the computer system 102. The other ML model can run on the computer system 102 or be downloaded to the driver device 112. The delivery driver uses a camera of the driver device 112 to scan the delivery location. When the image data indicates the camera is scanning a portion of the delivery location that corresponds to the correct drop-off location, an indication of the correct drop-off location (e.g., "correct drop-off location") is presented as an overlay over the image data at the driver device 112. When the image data indicates the camera is scanning a portion of the delivery location that corresponds to an incorrect drop-off location, an indication of the incorrect drop-off location (e.g., "incorrect drop-off location") is presented as an overlay over the image data at the driver device 112.

The delivery driver takes an image, referred herein also as a photo-on-delivery (POD), of the item at the delivery location during drop-off. The image can be image data stored as a file (e.g., the image includes image data). During post-delivery 130, the computer system 102 process the image using one or more ML models. If the computer system 102 determines the item was delivered to an incorrect delivery location based on the image processing, the driver device 112 receives delivery notification data 134A indicating the item was delivered to an incorrect delivery location from the computer system 102. A customer device 122 associated with the correct delivery location (e.g., a device of a user associated with that location) or the incorrect delivery location (e.g., a device of another user associated with that location) may also receive the delivery notification data 134B. Although such processing is described as being performed post-delivery 130, the processing may be performed during the delivery 120 such that an indication of an incorrect delivery is provided in real-time. Additionally or alternatively, the image is processed to determine delivery image evaluation data 126. The delivery image evaluation data 126 indicates a quality (e.g., good or poor) of the image to the driver device 112. The delivery image evaluation data 126 may also include suggestions for image improvement (e.g., "hold device still", "zoom out", "hold device upright). The computer system 102 can process the image data and send the delivery image evaluation data 126 to the driver device 112 in real-time during delivery 120, or during post-delivery 130.

As referenced in FIG. 1 and in the following figures, "real time" refers to a relative time that accounts for any underlying processing. For example, image data is received at time $t_0$ and image processing is immediately performed but takes a time length of $\Delta t$ to complete. At time $t_1 = \Delta t + t_0$ the image processing is complete. In this example, time $t_1$ is considered to be in real time relative to time $t_0$.

Figure 2:
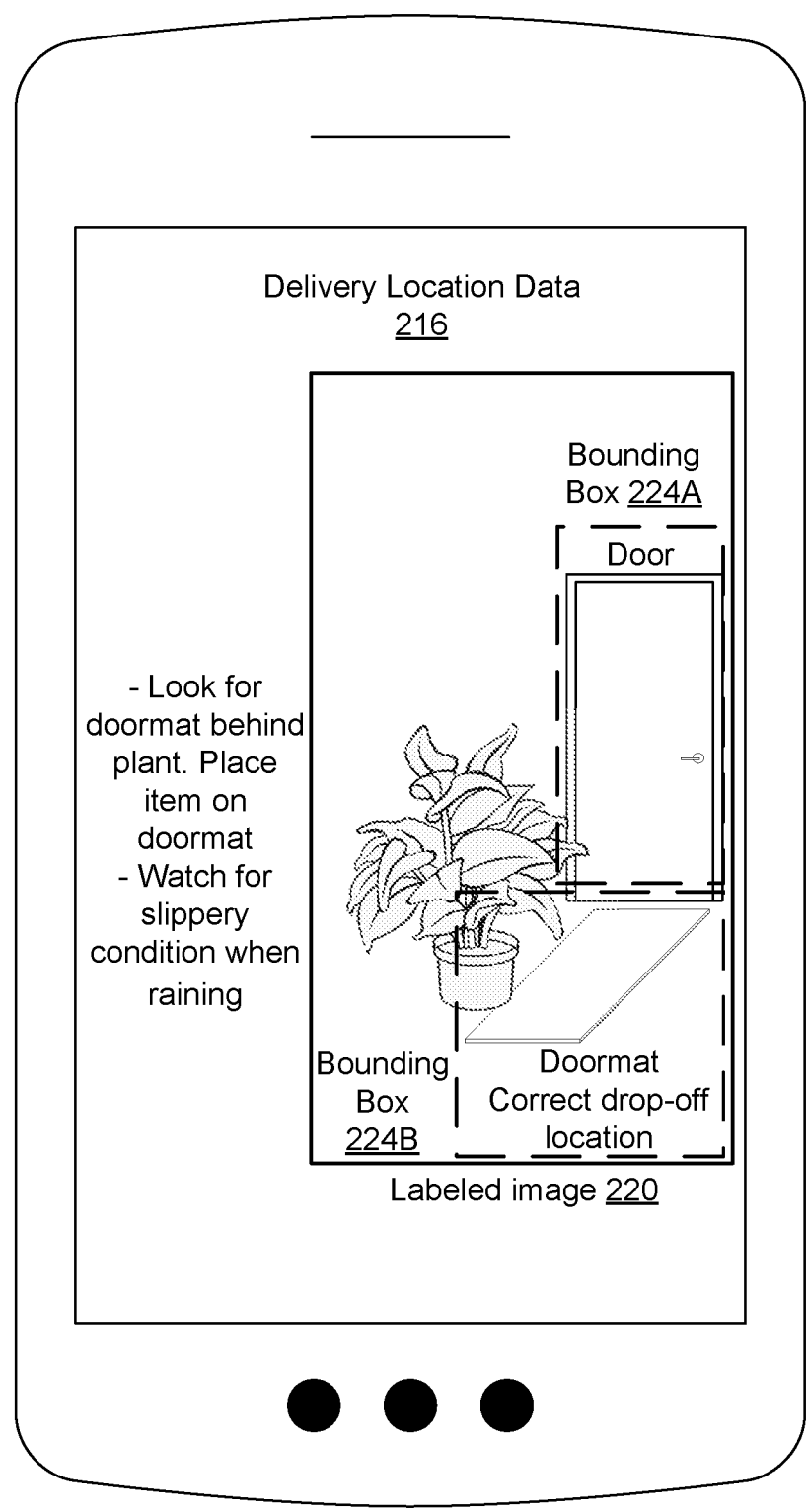
FIG. 2 illustrates an example of a driver device receiving delivery location data for an item delivery, according to embodiments of the present disclosure.

FIG. 2 illustrates an example of a driver device 212 receiving delivery location data 216 for an item delivery, according to embodiments of the present disclosure. Prior to a delivery at a delivery location, the driver device 212 receives the delivery location data 216. The driver device 212 receives the delivery location data 216 from an AI model downloaded from a computer system and executing on the driver device 212 or executing on the computer system. A single AI model, such as an object detector ML, may be used for a plurality of delivery locations, where this is trained using a set of images showing item drop-offs (e.g., PODs of previous deliveries across different delivery locations). A set of images showing item drop-offs at the delivery location (e.g., PODs showing item drop-offs at the delivery location) are input to this AI model, whereby the AI model outputs the delivery location data 216 specific to the delivery location. The delivery location data 216 includes identifiers of objects at the delivery location, relative positioning of the objects, and a correct drop-off location at the delivery location. The delivery location data 216 may additionally include a safety warning based on environmental data of the delivery location. The delivery location data 216 can be a textual description, a labeled image, or a combination of these.

As illustrated in FIG. 2, the delivery location data 216 received by the driver device 212 includes a textual description "Look for doormat behind plant. Place item on doormat. Watch for slippery condition when raining." The AI model determines the safety warning of "watch for slippery condition when raining" based on environmental data associated with the delivery location. The delivery location data 216 also includes a labeled image 220 of the delivery location, where the labeled image 220 shows objects, and optionally their identifiers (e.g., as labels), bounding boxes, and the correct drop-off location at the delivery location. The labeled image 220 is from the set of PODs used to generate the delivery location data 216. A first bounding box 224A is positioned around and labels a door. A second bounding box 224B of the labeled image 220 is positioned around and labels a doormat. The second bounding box 224B additionally indicates the correct drop-off location is on the doormat.

Figure 3:
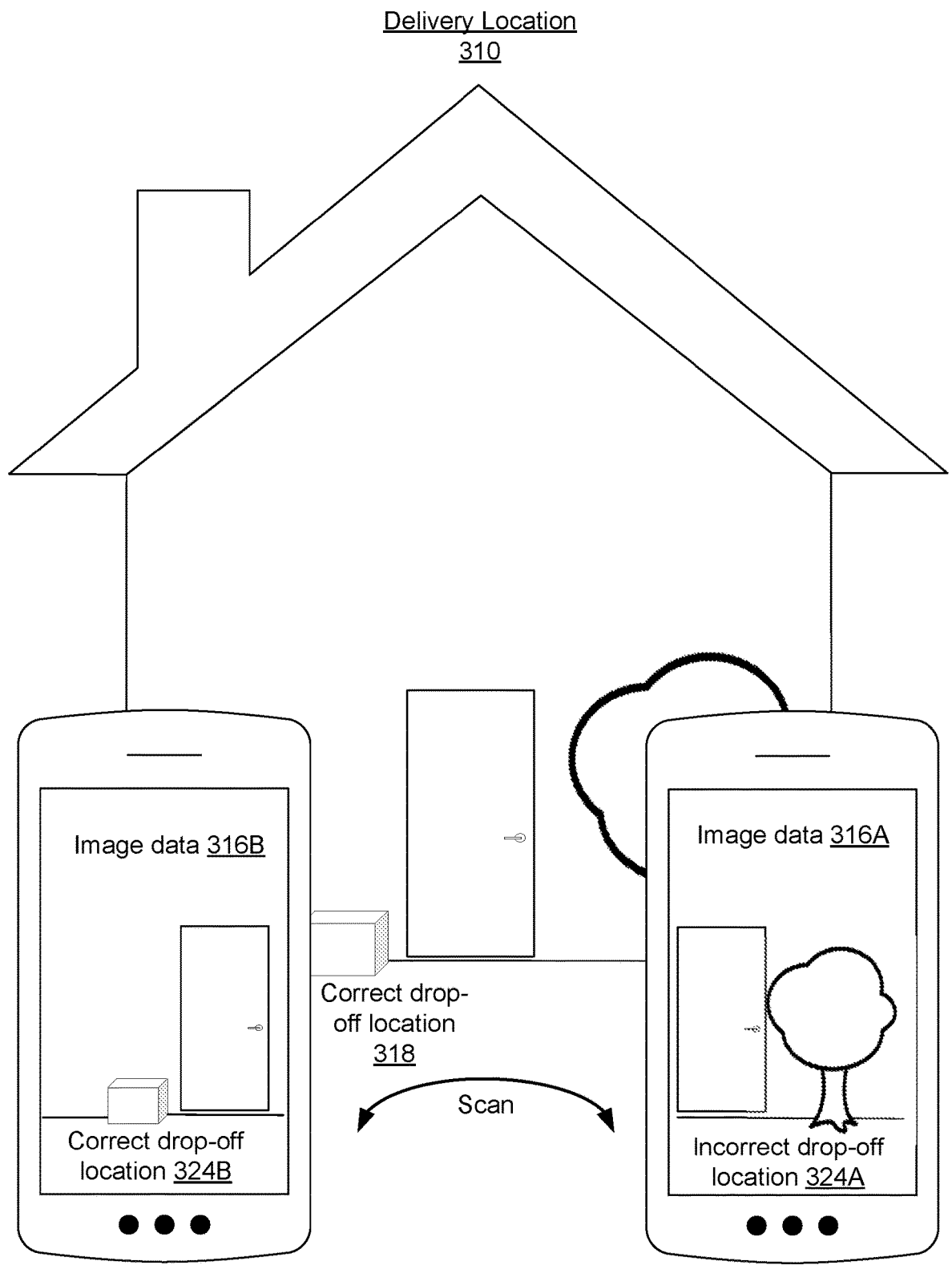
FIG. 3 illustrates an example of a driver device receiving delivery assistance data for an item delivery, according to embodiments of the present disclosure.

FIG. 3 illustrates an example of a driver device 312 receiving delivery assistance data 324A and 324B for an item delivery, according to embodiments of the present disclosure. An AI model associated with a delivery location 310 processes image data to determine a correct drop-off location 318 at the delivery location 310. The AI model is trained based on images showing drop-offs at the delivery location 310 (e.g., previous PODs at the delivery location 310) and, optionally, images of drop-offs at one or more other delivery locations (e.g., previous PODs at another delivery location). The AI model can be downloaded from a computer system and executing on the driver device 312 or can be executing on the computer system. Multiple AI models can be trained, each associated with a different delivery location, and each used in association with the associated delivery location.

In an example where the driver device 312 runs the AI model, a camera of the driver device 312 generates image data 316A showing a portion of the delivery location 310. The image data 316A is input to the AI model, and the driver device 312 receives an indication of whether the portion corresponds to the correct drop-off location 318. Receiving the indication causes the delivery assistance data 324A to be presented on a display of the driver device 312. The presentation is presented in real time relative to the image data 316A being generated. The presentation includes the image data 316A and the indication in an overlay over the image data 316A. As illustrated, the delivery assistance data 324A includes the presentation of the indication "incorrect drop-off location", indicating the portion of the delivery location 310 included in the image data 316A does not correspond to the correct drop-off location 318.

The camera scans the delivery location 310, and generates additional image data in real time. At some point, the camera generates image data 316B. The image data 316B is input to the AI model, and the driver device 312 receives the delivery assistance data 324B in real-time relative to the image data 316B being generated. As illustrated, the presentation of the delivery assistance data 324B includes the indication "correct drop-off location", indicating the portion of the delivery location 310 included in the image data 316B corresponds to the correct drop-off location 318.

In an example where the computer system runs the AI model, the computer system receives the image data from the driver device 312 (e.g., as an image uploaded from the delivery device 312 or as an image stream from the driver device 312). The computer system sends the indication of whether the image data corresponds to the correct drop-off location 318 to the driver device 312 in real-time relative to the image being received or in non-real time. The computer system causes the presentation of the delivery assistance data on the display of the driver device 312 showing the indication over the image data.

Figure 4:
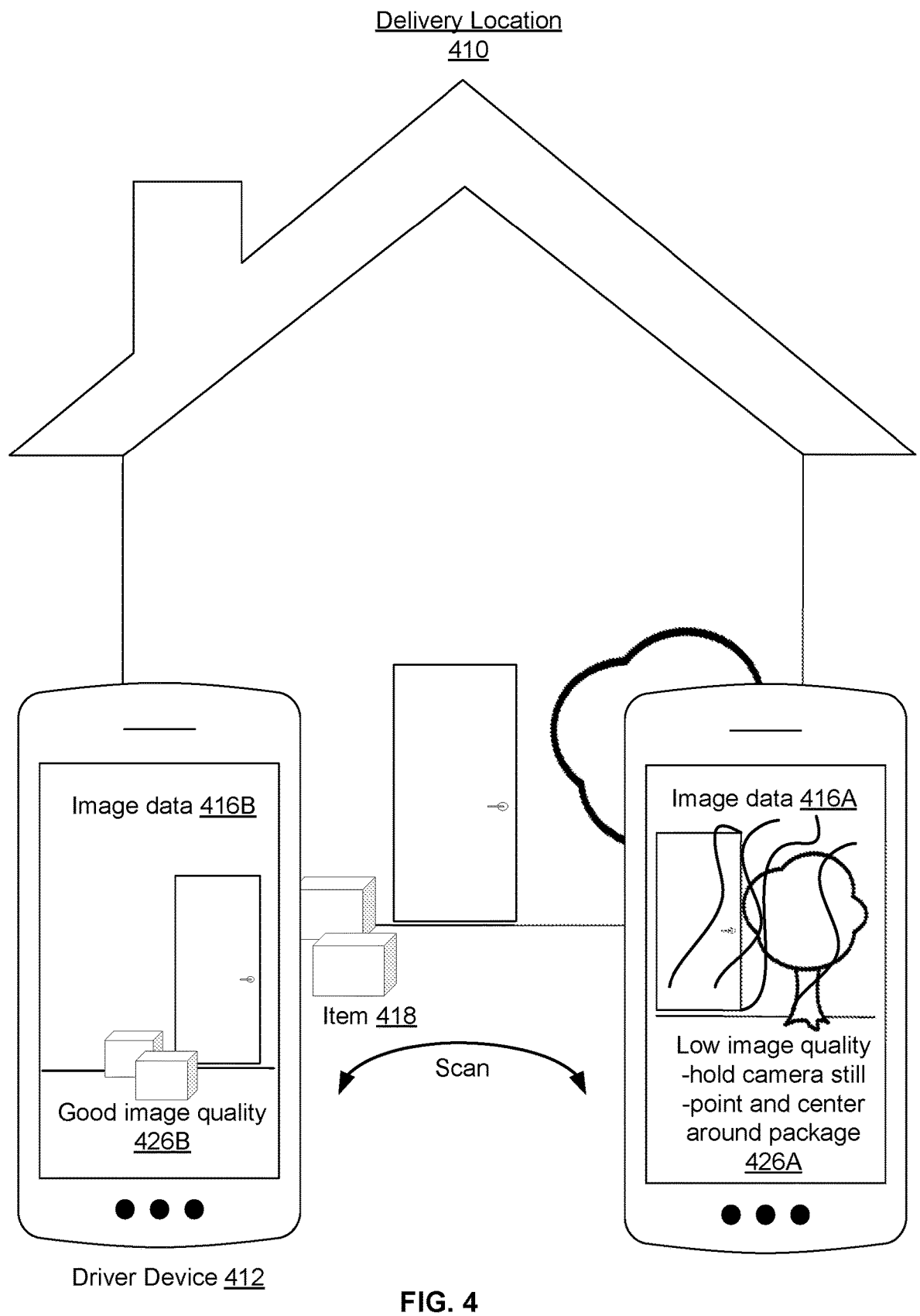
FIG. 4 illustrates an example of a driver device receiving delivery image evaluation data for an item delivery, according to embodiments of the present disclosure.

FIG. 4 illustrates an example of a driver device 412 receiving delivery image evaluation data 326A and 326B for an item delivery, according to embodiments of the present disclosure. An AI model processes image data showing a drop-off of an item 418 to determine an image quality evaluation. In an example, a single AI model is used. This AI model is trained based on images showing drop-offs of items at multiple delivery locations (e.g., previous PODs at the multiple delivery locations). The AI model may be trained on image attributes such as blurriness, brightness, angle relative to a drop-off location, relative location of a dropped off item in an image, and contextual background around a dropped off item to determine image quality evaluation. The image evaluation data can include additionally include a recommendation for image quality improvement for improving image quality. The AI model can be downloaded from a computer system and executing on the driver device 412 or executing on the computer system. The processing of the image data may occur in real time, or during a post-delivery stage of the item delivery.

In an example where the driver device 412 receives image quality evaluation data in real time, a camera of the driver device 412 generates image data 416A showing the drop-off of the item 418. The image data 416A is input to the AI model. The driver device 412 receives image quality evaluation data 426A from the AI model based on the image data 416A. As illustrated the image quality evaluation data 426A indicates the image data 416A corresponds to a "low quality image" because the image data 416A is blurry and does not include the item 418. The image quality evaluation data 426A additionally includes a recommendation for image quality improvement of "Hold camera still. Point and center around package" based on the image data 416A having image attributes of blurriness and not including the item 418. The driver device 412 may receive the image quality evaluation data 426A in real time, such that image data of a good quality can be achieved while a driver is at the delivery location 410.

In an example, the camera scans the delivery location 410, and generates additional image data in real time. At some point, the camera generates image data 416B. The image data 416B is input to the AI model. The driver device 412 receives image quality evaluation data 426B from the AI model based on the image data 416B. As illustrated the image quality evaluation data 426B indicates the image data 416B corresponds to a "good image quality" because the image data 416B is not blurry, includes the item 418, and includes a suitable amount of background context of the delivery location 410. Here, "low" and "good" are qualitative score of an image quality evaluation. Other qualitative scores and/or quantitative scores (e.g., a number from a scale of zero to ten) can be similarly used.

In an example where the driver device 412 receives the image quality evaluation data during post-delivery, the image data showing the item drop-off generated by the camera is input to the AI model. At a later time (e.g., not real time), the driver device 412 receives the image evaluation data indicating an image quality, and if applicable, an image quality improvement. The image evaluation data may be used by the driver to improve image quality of PODs at subsequent delivery locations.

Figure 5:
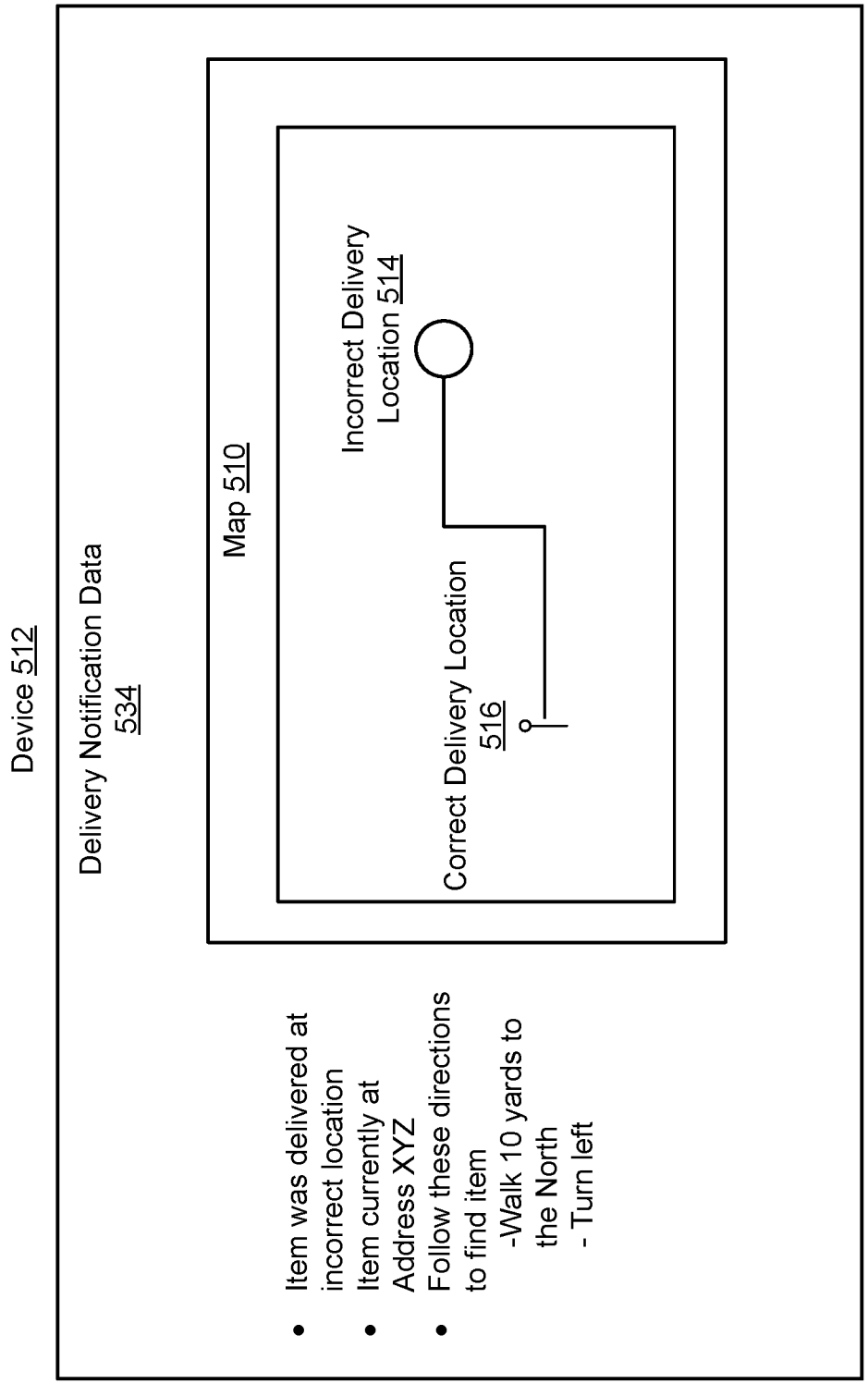
FIG. 5 illustrates an example of a driver device receiving delivery notification data for an item delivery, according to embodiments of the present disclosure.

FIG. 5 illustrates an example of a device 512 receiving delivery notification data 534 for an item delivery, according to embodiments of the present disclosure. The delivery notification data 534 is generated upon a determination that an item was delivered to an incorrect drop-off location (e.g., using the AI model discussed in connection with FIG. 3) and upon an AI model processing image data of a drop-off at a delivery location and determining an item was delivered to an incorrect drop-off location. The AI model is associated with the delivery location and is trained based on images showing drop-offs at the delivery location (e.g., previous PODs at the delivery location) and, optionally, images of drop-offs at one or more neighboring delivery locations (e.g., previous PODs at a delivery location having a next street address). The AI model can be downloaded from a computer system and executing on the device 512 or can be executing on the computer system. Multiple AI models can be trained, each associated with a different delivery location, and each used in association with the associated delivery location. The incorrect drop-off location can be located at another delivery location (e.g., an incorrect delivery location). The device 512 receiving the delivery notification data 534 may be a device of a driver performing the item delivery, a device associated with the delivery location (e.g., the correct delivery location), a device of associated with the incorrect delivery location, or any combination of these.

In an example, the device 512 receives the delivery notification data 534 including a textual description and a map 510. The map 510 shows an incorrect delivery location 514 and a correct delivery location 516. The textual description includes information about the incorrect delivery location 514. For example, the delivery notification data 534 includes the textual description "Item was delivered at incorrect location. Item currently at Address XYZ. Follow these directions to find item: walk ten yards to the North; turn left." The delivery notification data 534 may be usable by a driver or customer to retrieve the item and relocate it to the correct drop-off location.

Figure 6:
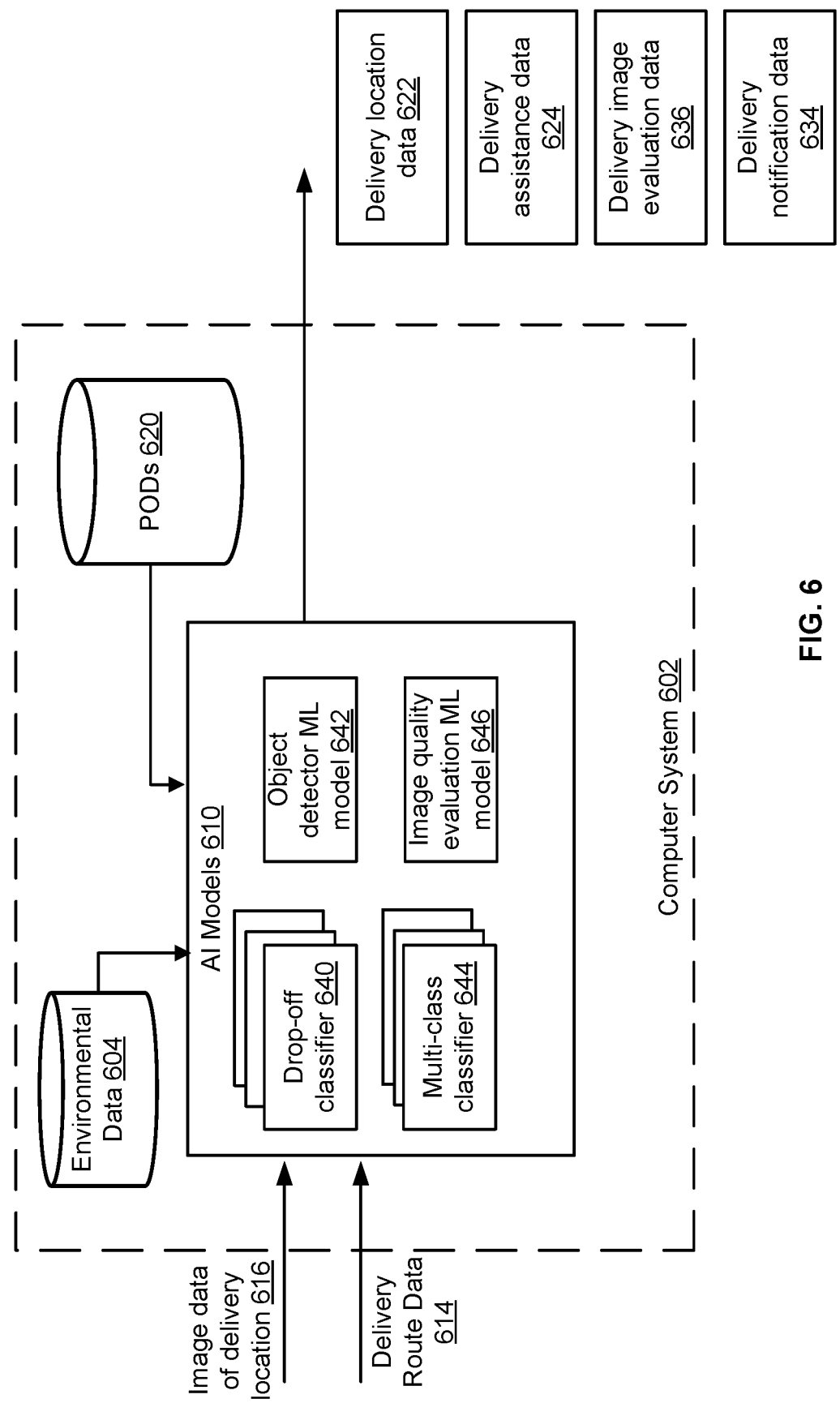
FIG. 6 illustrates an example of a computer system performing delivery-related image processing, according to embodiments of the present disclosure.

FIG. 6 illustrates an example of a computer system 602 performing delivery-related image processing, according to embodiments of the present disclosure. The computer system 602 is capable of supporting various computing services including, for instance, image processing operations. In particular, the computer system 602 includes one or more processors, one or more memories storing computer-readable instructions, one or more network interfaces, and/or other computing components.

In an example, the computer system 602 includes AI models 610 that receive various inputs. For example, the AI models 610 receive environmental data 604, PODs 620, a delivery route data 614, and image data of a delivery location 616. The environmental data 604 is associated with a delivery location and may include weather conditions for the delivery location. The PODs 620 are images including image data from previous deliveries at the delivery location and other delivery locations. The delivery route data 614 relates to a route for a driver delivering items. The image data of a delivery location 616 can be an image showing a drop-off location at the delivery location. The image data of a delivery location 616 may alternatively be received by the AI models 610 in real time using a camera of a device associated with the delivery.

In an example, the AI models 610 include a drop-off classifier 640 for each delivery location, an object detector ML model 642 applicable to different delivery locations, a multi-class classifier 644 for each delivery location, and an image quality evaluation ML model 646. The AI models 610 can be continuously trained, whereby new PODs and/or new environmental data can be used to retrain one or more of the AI models.

In real time, the drop-off classifier 640 determines and outputs delivery assistance data 624 of whether the image data of a delivery location 616 showing a portion of the delivery location corresponds to a correct drop-off location. An indication is presented on a display of the device indicating the image data of a delivery location 616 corresponds to an incorrect or a correct drop-off location to assist the driver in dropping off the item at the correct delivery location. The drop-off classifier 640 can alternatively process the image data of a delivery location 616 after the drop-off to determine delivery notification data 634 of whether the item was delivered to the correct drop-off location. The delivery notification data 634 indicating an incorrect drop-off is sent to the device of the driver.

In an example, the object detector ML model 642 determines and outputs delivery location data 622 identifying objects at the delivery location, relative positioning of the objects, and the correct drop-off location. The delivery location data 622 may include an image from a previous drop-off at the delivery location that is labeled. The labeled image can include bounding boxes around the objects and the correct drop-off location. The object detector ML model 642 can additionally use the environmental data 604 to determine a safety warning associated with the correct drop-off location that can be included in the delivery location data 622. The safety warning may alternatively be generated by an additional AI model that receives the environmental data 604 and the object identifications from the object detector ML model 642.

In an example, the multi-class classifier 644 also determines the delivery notification data 634. After the drop-off classifier 640 determines an incorrect drop-off location, the multi-class classifier 644 determines an additional delivery location (e.g., address) corresponding to the incorrect drop-off. The additional delivery location is included in the delivery notification data 634 and is sent to at least one of the device of the driver, a device associated with the correct drop-off location, or a device associated with the incorrect drop-off location.

In an example, the image quality evaluation ML model 646 receives image data showing the drop-off of the item. The image quality evaluation ML model 646 determines and outputs delivery image evaluation data 636 that includes an image quality evaluation. The image quality evaluation ML model 646 can additionally determine a recommendation about an image quality improvement based on an image attribute (e.g., blurriness, brightness, angle relative to an item drop-off, relative location of the item drop-off in an image, or contextual background around the item drop-off). The recommendation is included in the delivery image evaluation data 636, which may be displayed on the device in real time during the drop-off, or subsequent to the drop-off.

Figure 7:
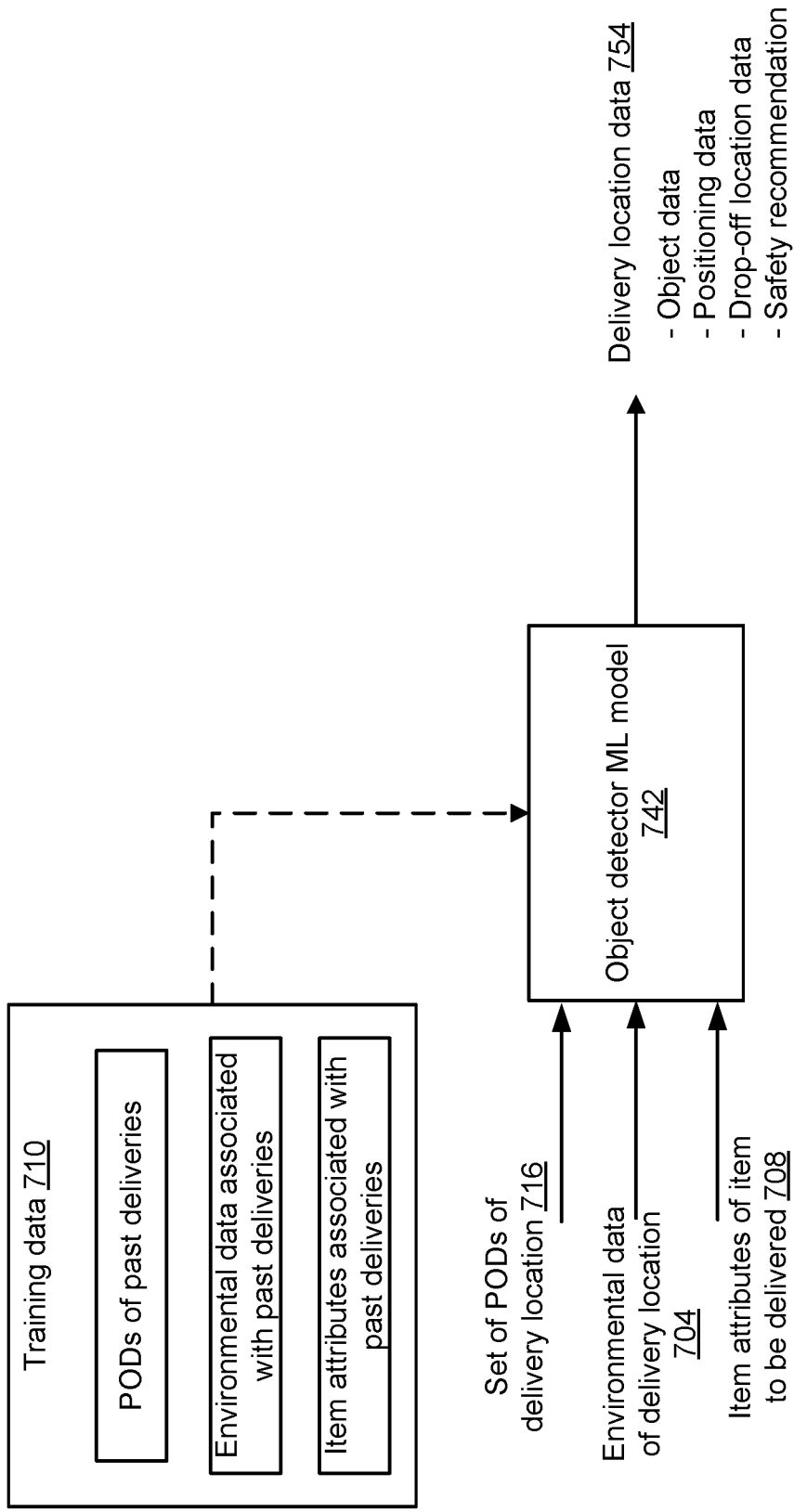
FIG. 7 illustrates an example of an AI model of a system generating delivery location data, according to embodiments of the present disclosure.

FIG. 7 illustrates an example of an AI model of a system generating delivery location data 754, according to embodiments of the present disclosure. In an example, the AI model is an object detector ML model 742) that is trained using training data 710. The training data 710 includes PODs of past deliveries, environmental data (e.g., weather conditions) associated with the past deliveries, and item attributes of items delivered in past deliveries across multiple delivery locations. For example, the item attributes can include a susceptibility of an item to damage in certain weather conditions. The PODs of past deliveries may be linked with environmental data associated with the past deliveries. The combination of the PODs and environmental data can be labeled with safety warnings (e.g., "watch for ice when cold", "watch for thorns on flower", etc.) during training. The environmental data and item data associated with past deliveries can also be linked during training for determining a correct drop-off location given certain weather conditions and the item attributes. Other training approaches are possible. For instance, the training data 710 may alternatively include generic images and metadata of objects (e.g., ImageNet) such that the object detector ML model 742 is trained on a generic basis to detect objects. In yet another illustration, the object detector ML model 742 is a pre-trained model for generic object detection and is further trained using the PODs of past deliveries and, optionally, the associated environmental data and item attributes.

Once the object detector ML model 742 is trained, the object detector ML model 742 may be downloaded to a device associated with a delivery location, or the object detector ML model 742 may be executed on a computer system with which the device may be communicatively coupled. The object detector ML model 742 receives a set of PODs of a delivery location 716, environmental data of the delivery location 704, and item attributes of an item to be delivered 708 to the delivery location. The object detector ML model 742 determines the delivery location data 754 based on the training and the inputs. The delivery location data 754 includes object data identifying objects at the delivery location, positioning data of the objects at the delivery location, drop-off location data, and a safety recommendation. For example, the delivery location data 754 may indicate "Look for a doormat behind a plant. Place the item on the doormat. Watch for slippery condition when raining."

In some examples, the object detector ML model 742 may determine the drop-off location data and/or the safety recommendation of the delivery location data 754 based on the environmental data of the delivery location 704 and/or the item attributes of the item to be delivered 708. For example, the item data of the item attributes of the item to be delivered 708 may indicate the item is a paper bag susceptible to damage in rainy conditions and the environmental data of the delivery location 704 indicates rainy conditions during the drop-off. Based on the training and these inputs, the delivery location data 754 indicates to place the item on a porch under a covering.

Rather than using the object detector ML model 742 generating the drop-off location data and/or the safety recommendation of the delivery location data, logic that is hard-coded may be used to do so. For example, the hard-coding may include a set of if-then statements. The if statements may correspond to a particular item attribute and a particular environmental data. Additionally, the if statements may include a specified delivery preference of a customer associated with the delivery location. The then statements may correspond to particular drop-off location data and particular safety recommendations. For instance, the hard-coding may include "if the delivery location includes steps and the environmental data indicates a temperature below 32° F., then a safety warning includes 'watch for ice.'" As another illustration, the hard-coding may include "if the environmental data indicates sunny and item data indicates the item is food, then drop-off location data includes 'correct drop-off location is in the shade behind a plant.'"

Figure 8:
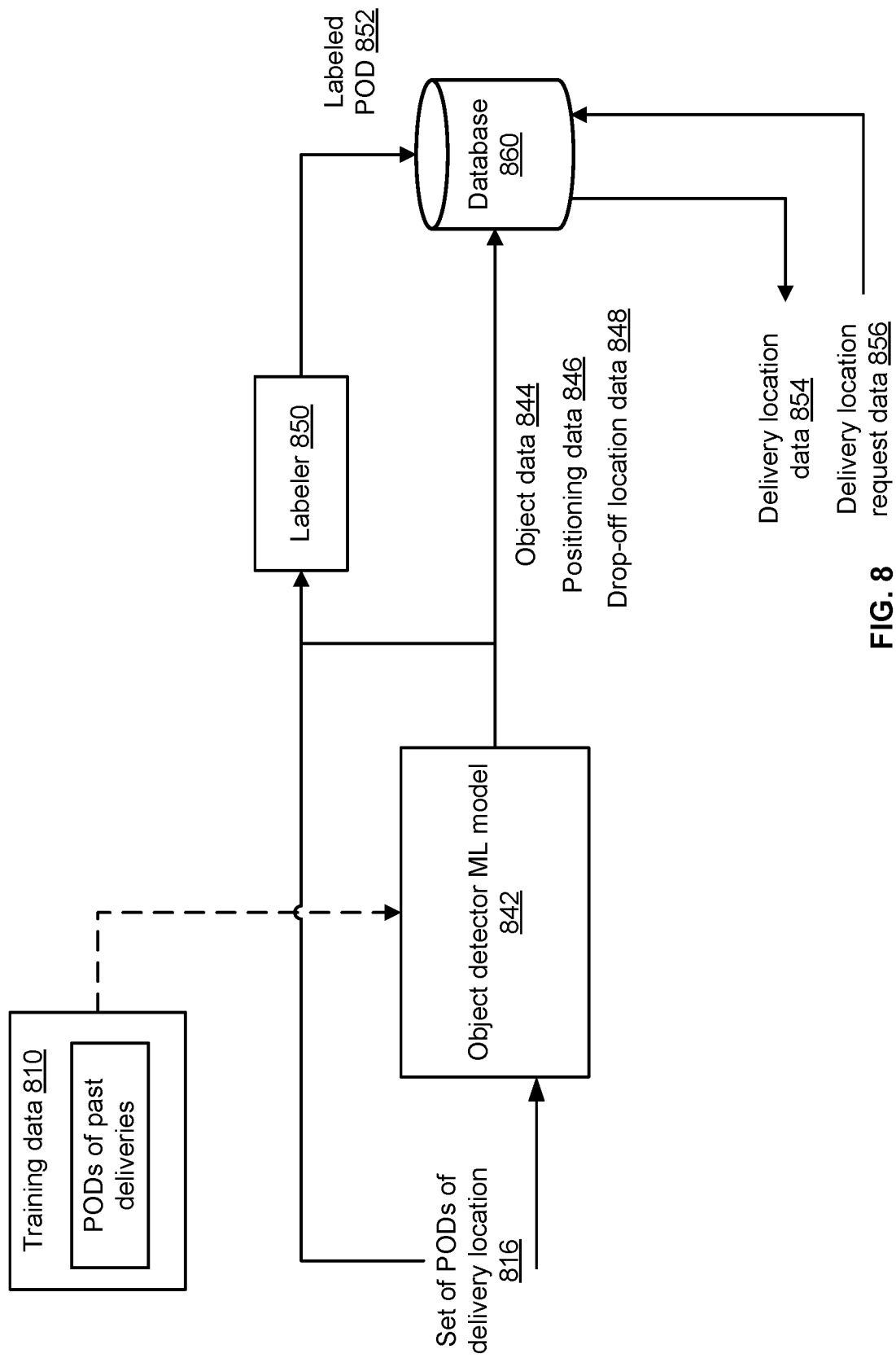
FIG. 8 illustrates another example an AI model of a system generating delivery location data, according to embodiments of the present disclosure.

FIG. 8 illustrates another example an AI model of a system generating delivery location data, according to embodiments of the present disclosure. The AI model is an object detector ML model 842, such as the object detector ML model 742 in FIG. 7. The object detector ML model 842 is trained for object detection using training data 810. The training data 810 includes PODs of past deliveries. The PODs show historical item drop-offs at multiple delivery locations.

After training with PODS of past deliveries at various delivery locations, the object detector ML model 842 receives a set of PODs of a delivery location 816. The set of PODs show historical item drop-offs at the delivery location. The object detector ML model 842 determines object data 844 identifying objects at the delivery location, positioning data 846 identifying relative positioning of the objects at the delivery location, and drop-off location data 848 identifying a correct drop-off location at the delivery location. The positioning data 846 may include pixel information for locations of bounding boxes around objects identified in the object data 844. Additionally, the drop-off location data 848 may include pixel information for a bounding box around the correct drop-off location at the delivery location. In an example, the object data 844, the positioning data 846, and the drop-off location data 848 are sent from the object detector ML model 842 to a labeler 850 and a database 860.

The labeler 850 is an image processor that receives the object data 844, the positioning data 846, and the drop-off location data 848 and generates a labeled POD 852. The labeler 850 may provide labels to a POD of the set of PODs of the delivery location 816 for the bounding boxes identified in the positioning data 846 and the drop-off location data

848. For example, the labeler 850 adds a first label (e.g., "doormat", "door", "plant", etc.) for a first bounding box indicated in the positioning data 846 and a second label (e.g., "correct drop-off location") for a second bounding box indicated in the drop-off location data 848.

In an example, the database 860 stores the object data 844, the positioning data 846, the drop-off location data 848, and the labeled POD 852 for the delivery location. At some time, the database 860 receives delivery location request data 856 from a device associated with a drop-off at the delivery location. The delivery location request data 856 can be a request for data associated with the delivery location. The database 860 sends the object data 844, the positioning data 846, the drop-off location data 848, the labeled POD 852, or any combination of these to the device as delivery location data 854. For example, the delivery location data 854 can be presented on the device as illustrated in FIG. 2.

In an example, the device downloads the database 860 to access the delivery location data 854. Alternatively, the device may download specific entries for specific delivery locations from the database 860. In another example, the object detector ML model 842 is downloaded to the device and generates the delivery location data 854 prior to an item delivery.

Figure 9:
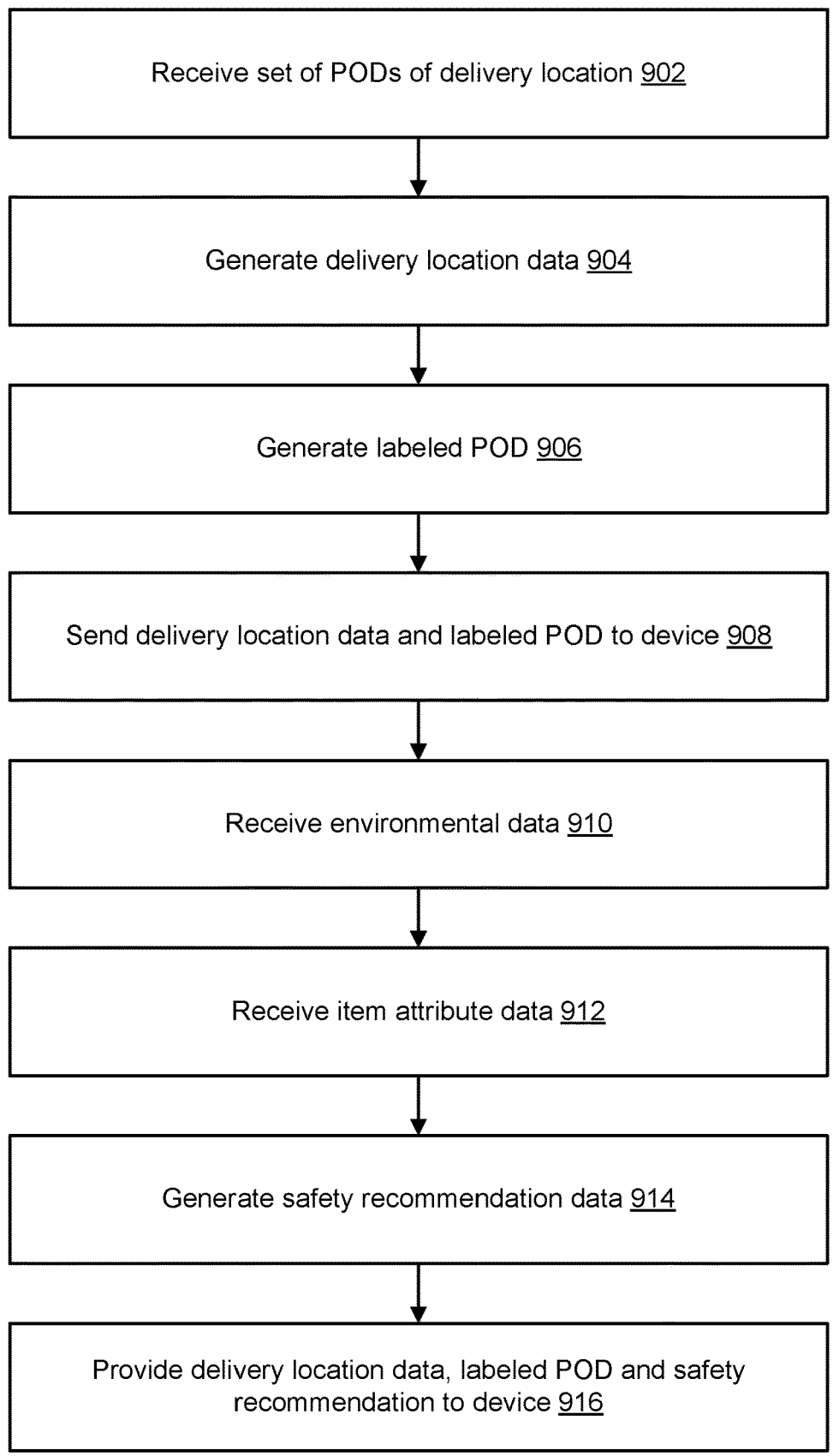
FIG. 9 illustrates an example of a flow for generating delivery location data, according to embodiments of the present disclosure.

FIG. 9 illustrates an example of a flow for generating delivery location data, according to embodiments of the present disclosure. Operations of the flow can be performed by a computer system, such as the computer system 602. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). Alternatively or additionally, some operations of the flow can be performed by a device, such as a device associated with delivery drive. While the operations are illustrated in a particular order, it should be understood that no particular order is necessary and that one or more operations may be omitted, skipped, performed in parallel, and/or reordered.

In an example, the flow includes operation 902, where the computer system receives a set of PODs of a delivery location. The set of PODs are images with image data showing previous item drop-offs at the delivery location.

In an example, the flow includes operation 804, where the computer system generates delivery location data. The delivery location data includes objects at the delivery location, relative positioning of the objects at the delivery location, and a correct drop-off location at the delivery location. The delivery location data is determined by an AI model, such as the object detector ML model 742 of FIG. 7 or the object detector ML model 842 of FIG. 8.

In an example, the flow includes operation 906, where the computer system generates a labeled POD. The labeled POD is a POD from the set of PODs with a first bounding box around one of the objects and a first label associated with the first bounding box. The labeled POD also includes a second bounding box around the correct drop-off location.

In an example, the flow includes operation 908, where the computer system sends the delivery location data and the labeled POD to a device. The device is a device associated with a delivery driver having a delivery route that includes the delivery location. For example, the device can be a device of a delivery driver dropping off an item to the delivery location. The delivery location data and the labeled POD may assist the delivery driver in locating the correct drop-off location at the delivery location.

In an example, the flow includes operation 910, where the computer system receives environmental data. The environmental data is associated with the delivery location and can include weather conditions for the delivery location at the time of the item delivery.

In an example, the flow includes operation 912, where the computer system receives item attribute data. The item attribute data include a susceptibility to damage in certain weather conditions. For example, the item attribute data can indicate the item is a paper bag susceptible to damage in rainy conditions.

In an example, the flow includes operation 914, where the computer system generates a safety recommendation. The safety recommendation is determined by the same AI model that determines the delivery location data, or by an additional AI model. The AI model determines the safety recommendation based on environmental data associated with the delivery location. For example, environmental data indicating a temperature below 32° F. results in the safety recommendation of "watch for ice." Similarly, a drop-off location data can be generated based on an item attribute of an item to be delivered to the delivery location and/or on the environmental data.

In an example, the flow includes operation 916, where the computer system provides the delivery location data, the labeled POD, and the safety recommendation (and, as applicable, the drop-off location data) to the device. The delivery location data, the labeled POD, the safety recommendation, and the drop-off location data may assist the driver in locating the correct drop-off location at the delivery location and safely dropping off the item.

Figure 10:
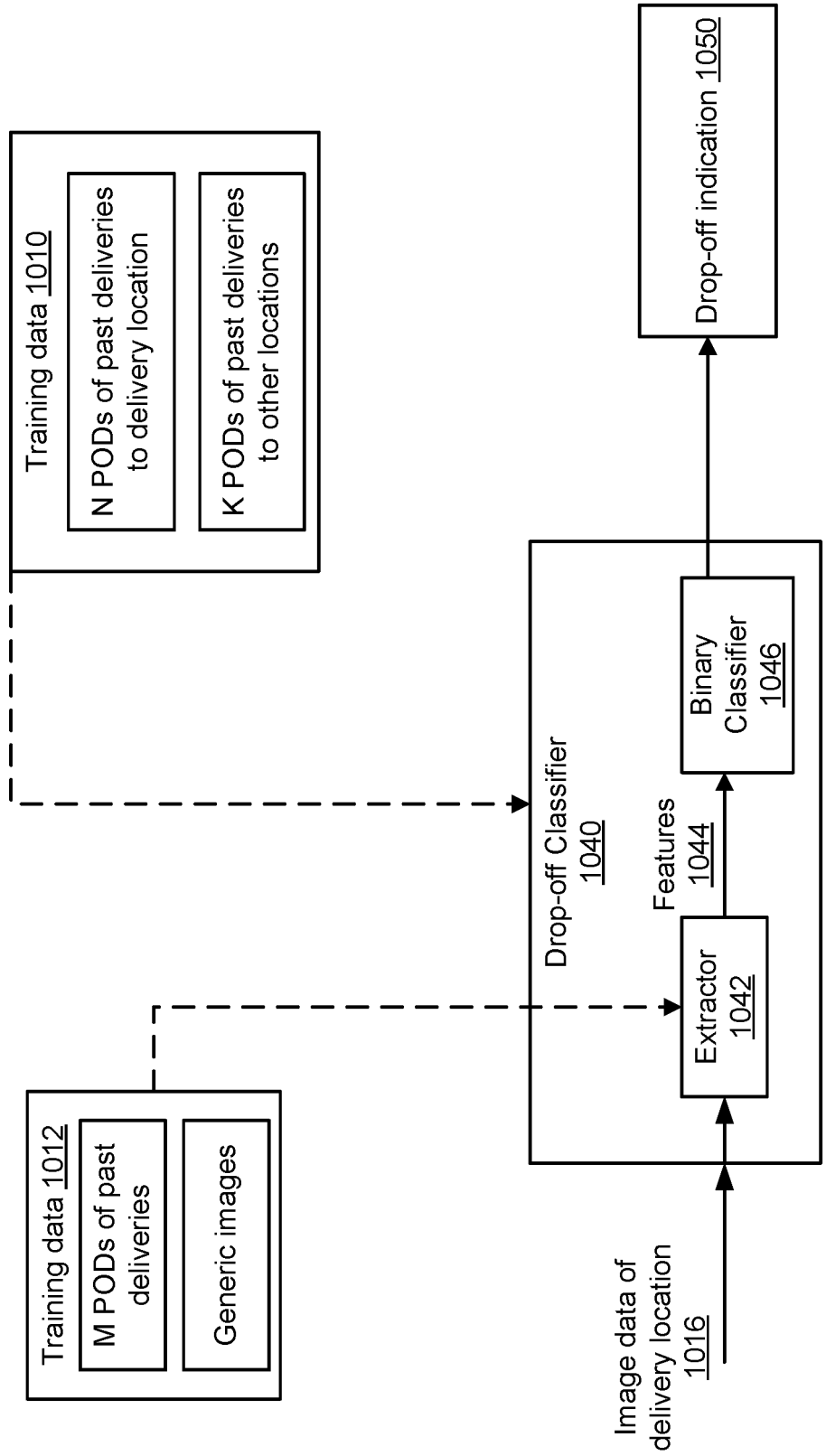
FIG. 10 illustrates an example of an AI model of a system generating a drop-off indication, according to embodiments of the present disclosure.

FIG. 10 illustrates an example of an AI model of a system generating a drop-off indication 1050, according to embodiments of the present disclosure. The AI model is a drop-off classifier 1040 (e.g., convolutional neural network) that is trained using training data 1010, such as the drop off classifier 640 of FIG. 6. The drop-off classifier 1040 includes a feature extractor 1042 and a binary classifier 1046. Training data 1010 is used to trained the binary classifier 1046 and includes "N" PODs of past deliveries to a delivery location and "K" PODs of past deliveries to other locations labeled as correct drop-offs and incorrect drop-offs, respectively (where "N" and "K" are positive integers). In some examples, "N" is at least one and "K" is at least one, and the sum of "N" and K" is less than twenty. Image augmentation (e.g., shifts, reflections, scale, and brightness) may be performed on the "K" PODs to generate a larger training dataset. Training data 1012 is used to train the extractor 1042 and includes "M" PODs of past deliveries (where "M" is a positive integer that is greater than "N" and "K." In an example "M" is in the hundreds or thousands). In other words, the extractor 1042 is trained with a larger number of images than the binary classifier 1046, such that the extractor 1042 can be trained once and used across multiple drop-off classifiers, whereas each of the drop-off classifier includes a different binary classifier trained specifically for a delivery location associated with that drop-off classifier. The extractor 1042 may additionally or alternatively be trained with generic images that are not of deliveries. In some examples, the extractor 1042 may initially be trained using the generic images, then further be trained using PODs of a specific area (e.g., an area including the delivery location). For instance, the PODS of a specific area can correspond to PODs from a city (or some other area definition) that includes the delivery location. The extractor 1042 is trained for feature extraction and the binary classifier 1046 is trained for drop-off classification (e.g., correct or incorrect). In some examples, the extractor 1042 is convolutional layers of a convolutional neural network, and the binary classifier 1046 is dense layers of the convolutional neural network.

In an example, the extractor 1042 is a pre-trained neural network (e.g., VGG16 trained on ImageNet) with a last layer removed, such that an output of the extractor 1042 are features 1044. The extractor 1042 receives image data of the delivery location and extracts features 1044 as a feature vector. The features 1044 may include objects present in the image data of the delivery location, positioning of objects, and the like.

In an example, the binary classifier 1046 receives the features 1044 to determine a drop-off classification. Each delivery location is associated with a different binary classifier 1046. Multiple models may be used to perform the drop-off classification. For example, a first model may perform classification using the features 1044, a second model may perform classification using a distance from the delivery location (e.g., target address) as a one-dimensional feature, and a third model may perform classification using both the features 1044 and the distance feature.

In an example, the drop-off classifier 1040 outputs a drop-off indication 1050 classifying the drop-off of an item as a correct or an incorrect drop-off. The drop-off indication 1050 may be determined in real time or during a post-delivery stage. As shown in FIG. 3, the drop-off indication 1050 may be presented on a display of a device associated with a delivery at the delivery location as the device scans the delivery area for the correct drop-off location.

In an example, the binary classifier 1046 can be continuously trained. Over time, once a new POD is generated with good quality (as determined by an additional AI model) and determined to be associated with the correct drop-off location, the POD can become part of training data 1010. For example, the binary classifier 1046 may be trained at a particular time interval (e.g., every three months). Alternatively, the binary classifier 1046 may be trained based on determining a trigger event associated with further training of the AI model. The trigger event is at least one of a delivery of another item to the delivery location or a user input indicating a change to the delivery location and/or to a drop-off location within the delivery location or a change to a user preference for the delivery location or the drop-off location. For example, the user input may indicate a change to using a back door for subsequent deliveries, and based on the user input, the drop-off classifier 1040 (or only the binary classifier 1046 associated with the delivery location) is re-trained.

Figure 11:
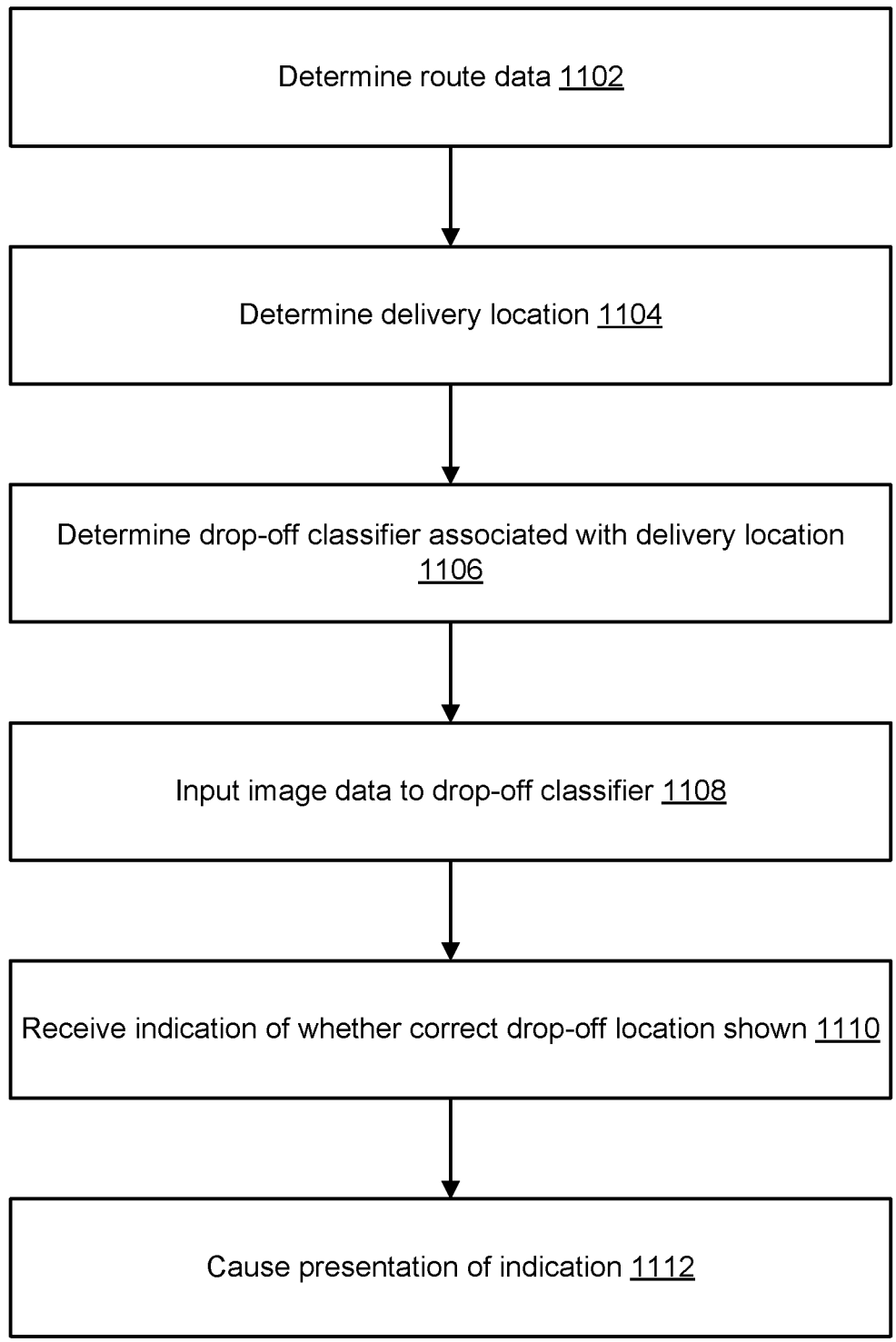
FIG. 11 illustrates an example of a flow for generating a drop-off indication, according to embodiments of the present disclosure.

FIG. 11 illustrates an example of a flow for generating a drop-off indication, according to embodiments of the present disclosure. As described below, operations of the flow can be performed by a computer system, such as the computer system 602 or the driver device 112. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1102, where the computer system determines route data. The route data includes delivery locations for item drop-offs. For example, the route data can include street addresses at which a driver has item deliveries.

In an example, the flow includes operation 1104, where the computer system determines a delivery location. The delivery location is determined from among the route data. The computer system can determine the delivery location from location data received from the device or by a delivery location selection from the driver.

In an example, the flow includes operation 1106, where the computer system determines a drop-off classifier associated with the delivery location. The drop-off classifier, as described in FIG. 10, is a feature extractor and a binary classifier for determining whether an item is dropped off at the correct drop-off location. Each delivery location is associated with a different drop-off classifier, where the feature extractor thereof is trained based on previous PODs across a large number of delivery locations, and where the binary classifier is trained based on a smaller set of PODs, some of which are specific to the delivery location.

In an example, the flow includes operation 1108, where the computer system inputs image data to the drop-off classifier. The image data may be generated in real time by a camera, or may be a non-real time image comprising image data showing a portion of the delivery location. The drop-off classifier extracts features of the image data to determine whether the image data shows the correct drop-off location.

In an example, the flow includes operation 1110, where the computer system receives an indication of whether the correct drop-off location is shown. The indication indicates whether the portion shown in the image data corresponds to the correct drop-off location based on the extracted features.

In an example, the flow includes operation 1112, where the computer system causes a presentation of the indication. The presentation of the indication (e.g., "correct drop-off location" or "incorrect drop-off location") is presented on the device associated with the driver and/or on a customer device. The customer may be associated with the incorrect drop-off location or the correct drop-off location. In an example where the device of the driver performs the operations of FIG. 9, only the device of the driver presents the indication. The device may receive the presentation in real time as the image data is generated, or during post-delivery after drop-off of the item.

Figure 12:
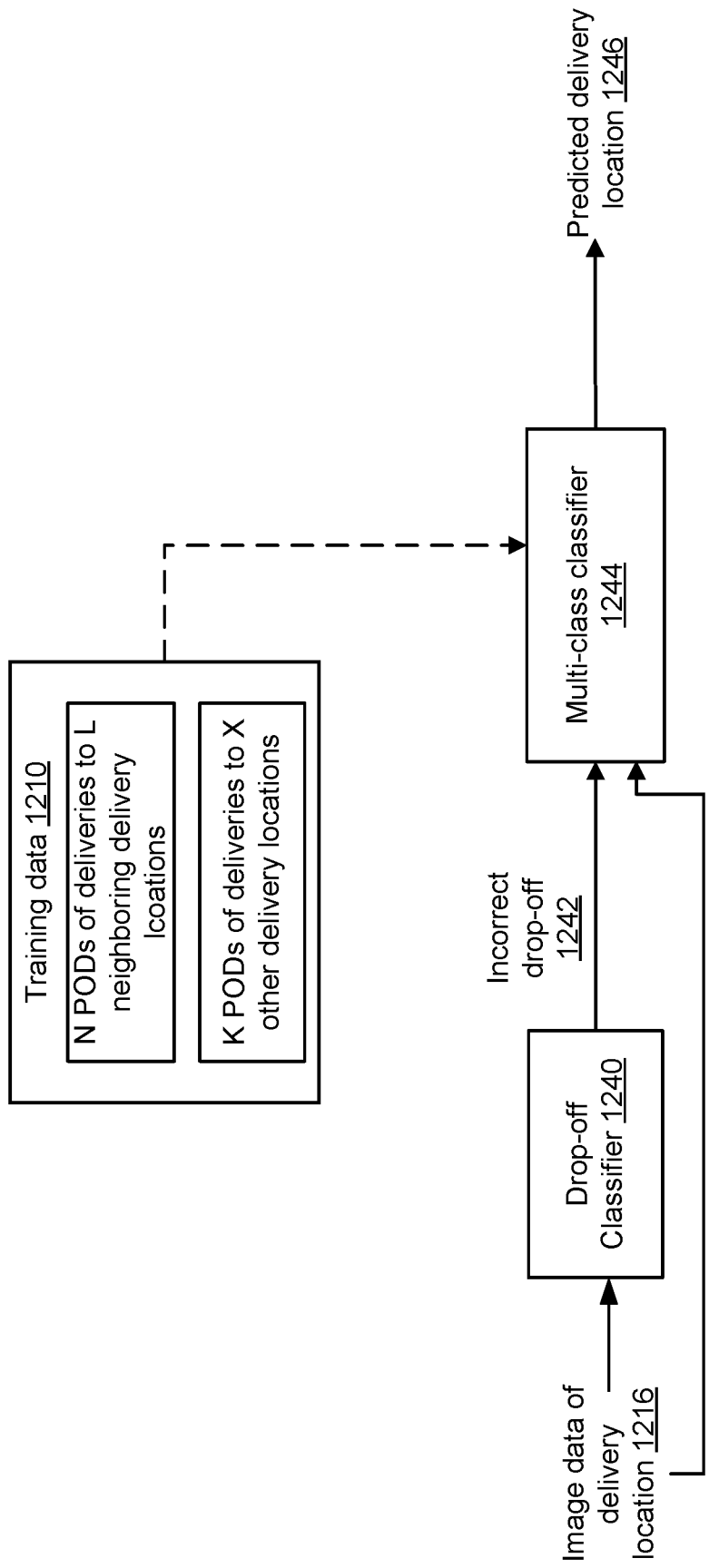
FIG. 12 illustrates an example of AI models of a system determining a predicted delivery location, according to embodiments of the present disclosure.

FIG. 12 illustrates an example of AI models of a system determining a predicted delivery location 1246, according to embodiments of the present disclosure. The AI models are each trained for a particular delivery location, such that each delivery location is associated with a different drop-off classifier 1240 and a different multi-class classifier 1244. The drop-off classifier 1240 is an example of the drop-off classifier 1040 in FIG. 10 with a feature extractor and binary classifier. The multi-class classifier 1244 is trained for delivery location prediction using training data 1210 that includes "N" PODs of deliveries to a delivery location and "K" PODs of deliveries to "L" neighboring delivery locations (where "N," "K," and "L" are positive integers and where "N" and "K" can have different values from the integers described in FIG. 10). The "L" neighboring delivery locations are within a distance range (e.g., ten street addresses) of the delivery location.

In an example, the drop-off classifier 1240 receives image data of the delivery location 1216 and determines an indication of an incorrect drop-off 1242. The indication of the incorrect drop-off 1242 may be a trigger to use the multi-class classifier 1244. Upon the trigger, the multi-class classifier 1244 also receives the image data of the delivery location 1216 and/or the features extracted by a feature extractor of the drop-off classifier 1240. If image data is received, the multi-class classifier 124 can include a feature extractor similar to that of the drop-off classifier 1240. In both cases, the multi-class classifier 1244 is trained to classify image data as corresponding to a drop-off in one of multiple classes, each of the classes corresponding to a different one of the "L" neighboring locations, and an additional class corresponding to a classification of "none of the "L" neighboring locations". For instance, a total of ten delivery locations are used: nine are neighboring, incorrect delivery locations and one is other, incorrect delivery location. In this illustration, the multi-class classifier 1244 has ten classes: nine corresponding to the nine delivery locations and one corresponding to all other delivery locations. The multi-class classifier 1244 is trained using the "N" PODs of the nine incorrect delivery locations and "K" PODs from other random delivery locations to classify image data as belonging to one of the ten classes. A classification of image data showing a delivery location as belonging to a class indicates that that the shown delivery location is the delivery location that corresponds to the class.

Once the multi-class classifier 1244 is trained, and upon the trigger, the image data of the delivery location 1216 or the features extracted thereof are input to the multi-class classifier 1244. In response, the multi-class classifier 1244 outputs the predicted delivery location 1246 of the incorrect drop-off as corresponding to one of the classes (referring back to the above illustration, the predicted delivery location 1246 is one of the nine incorrect delivery locations). The output about the predicted delivery location 1246 may be sent to a device of a delivery driver, a device of a user associated with the correct delivery location, and/or a device of a user associated with the predicted delivery location 1246. This output may allow for the item to be retrieved from the incorrect delivery location and delivered to the correct delivery location.

In another example, rather than using the multi-class classifier 1244, multiple binary classifiers (such as the binary classifier 1046 of FIG. 1) can be used. Each of these binary classifiers corresponds to a different delivery location that is either one of the correct delivery location or one of the "L" neighboring location and is trained using at least previous PODs specific to that delivery location (e.g., referring back to the nine neighboring locations, there would be nine binary classifiers each corresponding to one of the nine neighboring locations, in addition to the binary classifier corresponding to the correct delivery location). The image data or features extracted thereof are input to each of the binary classifier. The binary classifier that outputs a correct drop-off location prediction (or the prediction that has the highest likelihood) is determined and the delivery location corresponding to that binary classifier is determined to be the actual delivery location that was used for the drop-off.

Figure 13:
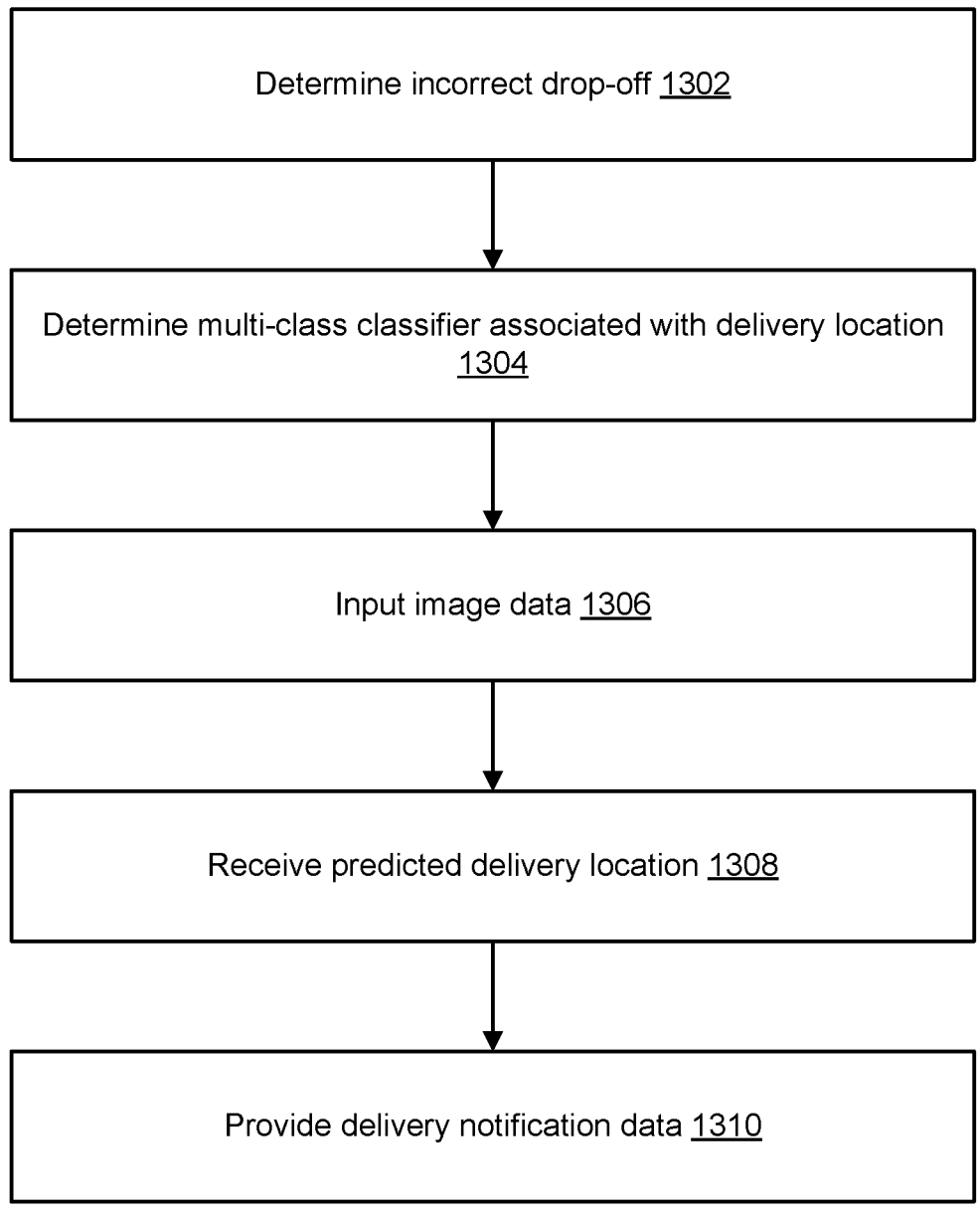
FIG. 13 illustrates an example of a flow for generating delivery notification data, according to embodiments of the present disclosure.

FIG. 13 illustrates an example of a flow for generating delivery notification data, according to embodiments of the present disclosure. As described below, operations of the flow can be performed by a computer system, such as the computer system 602 or the driver device 112. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1302, where the computer system determines an incorrect drop-off. A drop-off classifier, as described in FIG. 10, determines the incorrect drop-off. The incorrect drop-off may a drop-off of an item at an incorrect delivery location.

In an example, the flow includes operation 1304, where the computer system determines a multi-class classifier associated with the delivery location. The multi-class classifier, as described in FIG. 12, is trained based on images showing drop-offs at the delivery location and images showing drop-offs at neighboring delivery locations within a distance range of the delivery location (e.g., ten street addresses).

In an example, the flow includes operation 1306, where the computer system inputs image data. The image data (e.g., POD) of the incorrect drop-off is input to the multi-class classifier.

In an example, the flow includes operation 1308, where the computer system receives a predicted delivery location. The computer system receives the predicted delivery location corresponding to the delivery address at which the item was mostly likely dropped from the multi-class classifier.

In an example, the flow includes operation 1310, where the computer system provides delivery notification data. The delivery notification data includes an indication of the incorrect drop-off and instructions for locating the item. In an example where the operations are performed by the driver device, the delivery notification data is only presented at the driver device. If the operations are performed by a computer system in communication with the driver device, the delivery notification data is presented on at least one of the driver device, a device of a user associated with the delivery location, or a device of a user associated with the delivery address of the incorrect drop-off.

Figure 14:
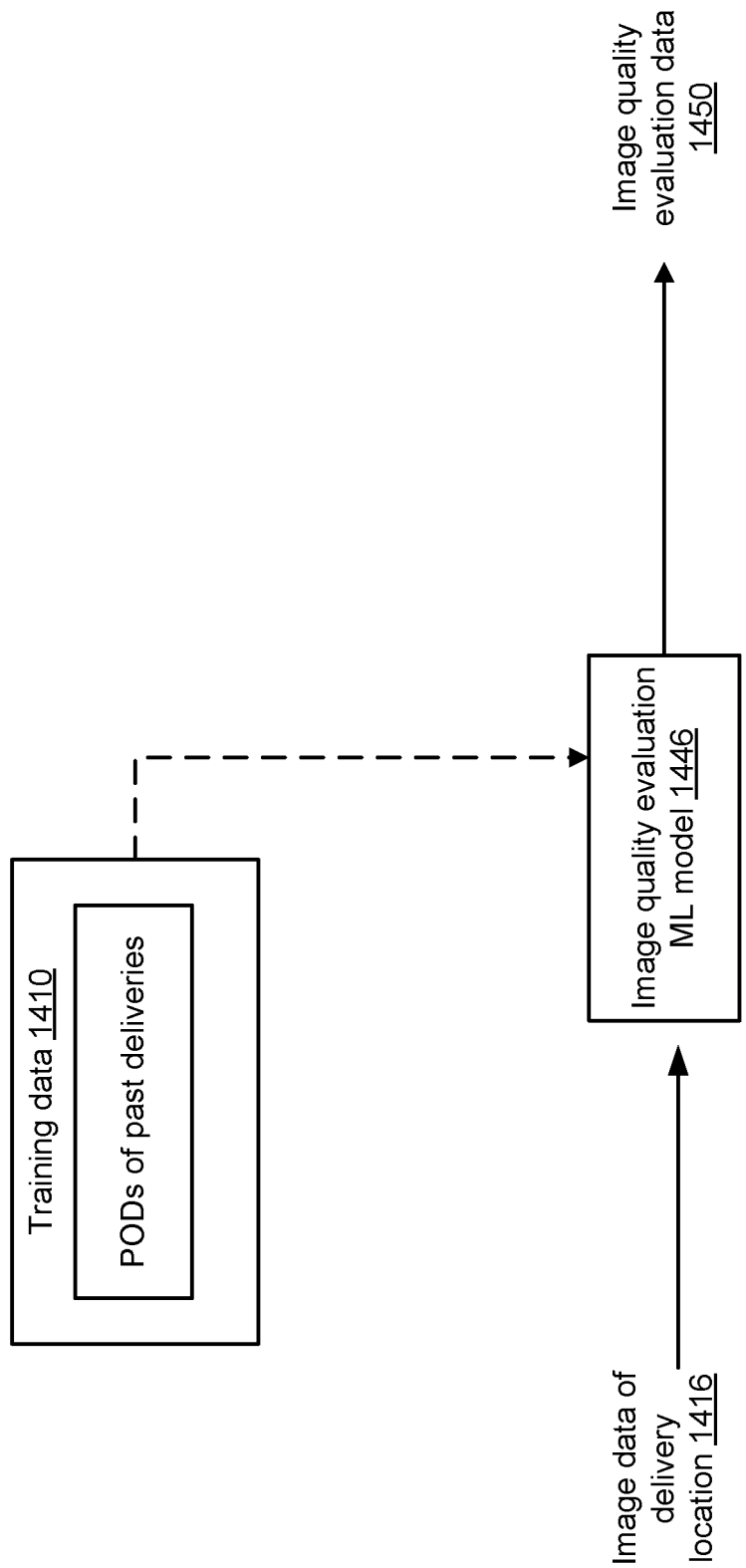
FIG. 14 illustrates an example of an AI model of a system generating image quality evaluation data, according to embodiments of the present disclosure.

FIG. 14 illustrates an example of an AI model of a system generating image quality evaluation data 1450, according to embodiments of the present disclosure. In an example, the AI model is an image quality evaluation ML model 1446 trained for drop-off image quality evaluation based at least in part on training data 1410. The training data 1410 includes PODs of past deliveries (not necessarily PODs of the delivery location) labeled with qualitative and/or quantities scores indicating image quality evaluations based on a set of image attributes. The set can include any or a combination of blurriness, brightness, an angle relative to an item drop-off, relative location of the item drop-off in the image, or contextual background around the item drop-off. The image quality evaluation ML model 1446 is trained to output the qualitative and/or quantitative scores.

After training, the image quality evaluation ML model 1446 receives image data of a delivery location 1416. The image quality evaluation data 1450 is output by the image quality evaluation ML model 1446 based on the training and the image data of the delivery location 1416. The image quality evaluation data 1450 may be output qualitatively (e.g., good quality or bad quality) or quantitatively (e.g., zero to one-hundred).

In an example, the image quality evaluation data 1450 is output in real time as a device associated with the delivery location scans the delivery location to generate the image data of the delivery location 1416, as shown in FIG. 4. In another example, the image quality evaluation data 1450 is processed and output by the image quality evaluation ML model 1446 during a post-delivery stage of the item drop-off.

Figure 15:
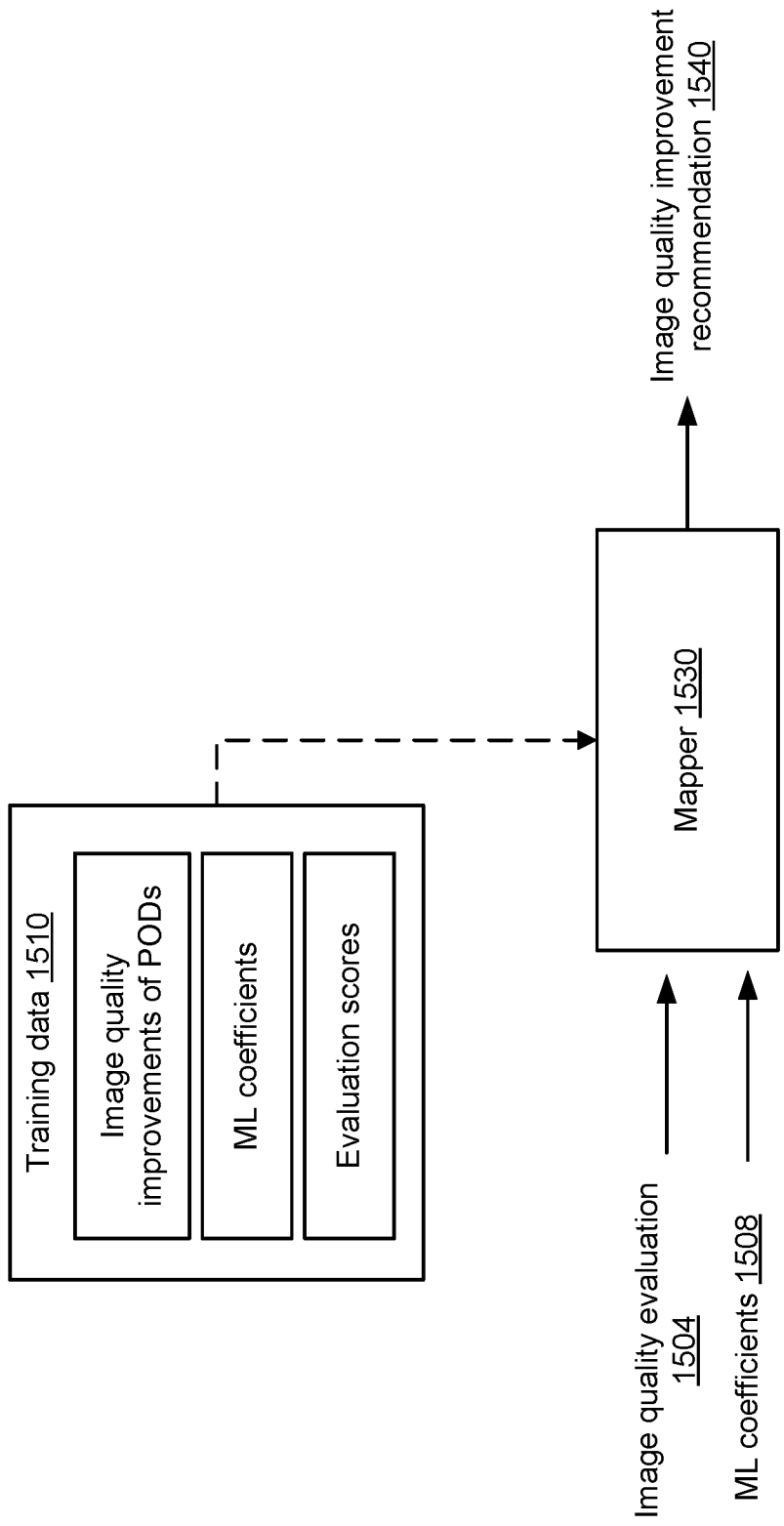
FIG. 15 illustrates an example of a mapper of a system generating an image quality improvement recommendation, according to embodiments of the present disclosure.

FIG. 15 illustrates an example of a mapper 1530 of a system generating an image quality improvement recommendation 1540, according to embodiments of the present disclosure. The mapper 1530, which can be implemented as an ML model, is trained for image quality improvement using training data 1510, such as to output recommendations about improving POD qualities. The training data 1510 includes labels of PODs of past deliveries, where the label per POD includes an image quality evaluation of the POD and a recommendation for image quality improvement. The labels are generated based on a set of image attributes (e.g., blurriness, brightness, angle relative to an item drop-off, relative location of the item drop-off in an image, or contextual background around the item drop-off). For example, a poor quality POD because of blurriness may be labeled with an image quality improvement of "hold device still" to reduce blurriness. The training data 1510 also includes ML coefficients of an image quality evaluation ML model (e.g., the image quality evaluation ML model 1446 of FIG. 14) that resulted in a particular image quality evaluation. The mapper 1530 is trained to map ML coefficients used in an image quality evaluation to an image quality improvement recommendation. The training data 1510 can also include evaluation scores from the image quality evaluation ML model. The mapper 1530 is trained to map evaluation scores to an image quality improvement recommendation.

In an example, an image quality evaluation 1504 below a certain qualitative or quantitative threshold may be used as a trigger. The image quality evaluation 1504 may include an evaluation score from the image quality evaluation ML model. Upon the trigger, the trained mapper 1530 receives ML coefficients 1508 of the image quality evaluation ML model that resulted in the image quality evaluation. The ML coefficients 1508 can be received from the image quality evaluation ML model.

In an example, the mapper 1530 maps the ML coefficients 1508 to an image quality improvement recommendation 1540. The image quality improvement recommendation 1540 can be output in real time as a device scans the delivery location to generate image data of the delivery location, as shown in FIG. 4. In another example, the image quality improvement recommendation 1540 is output by the mapper 1530 during a post-delivery stage of the item drop-off.

FIGS. 16-19 illustrate examples of flows for improving image processing related to item deliveries, according to embodiments of the present disclosure. Some or all of the instructions for performing the operations can be implemented as hardware circuitry and/or stored as computer-readable instructions on a non-transitory computer-readable medium of a computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 16:
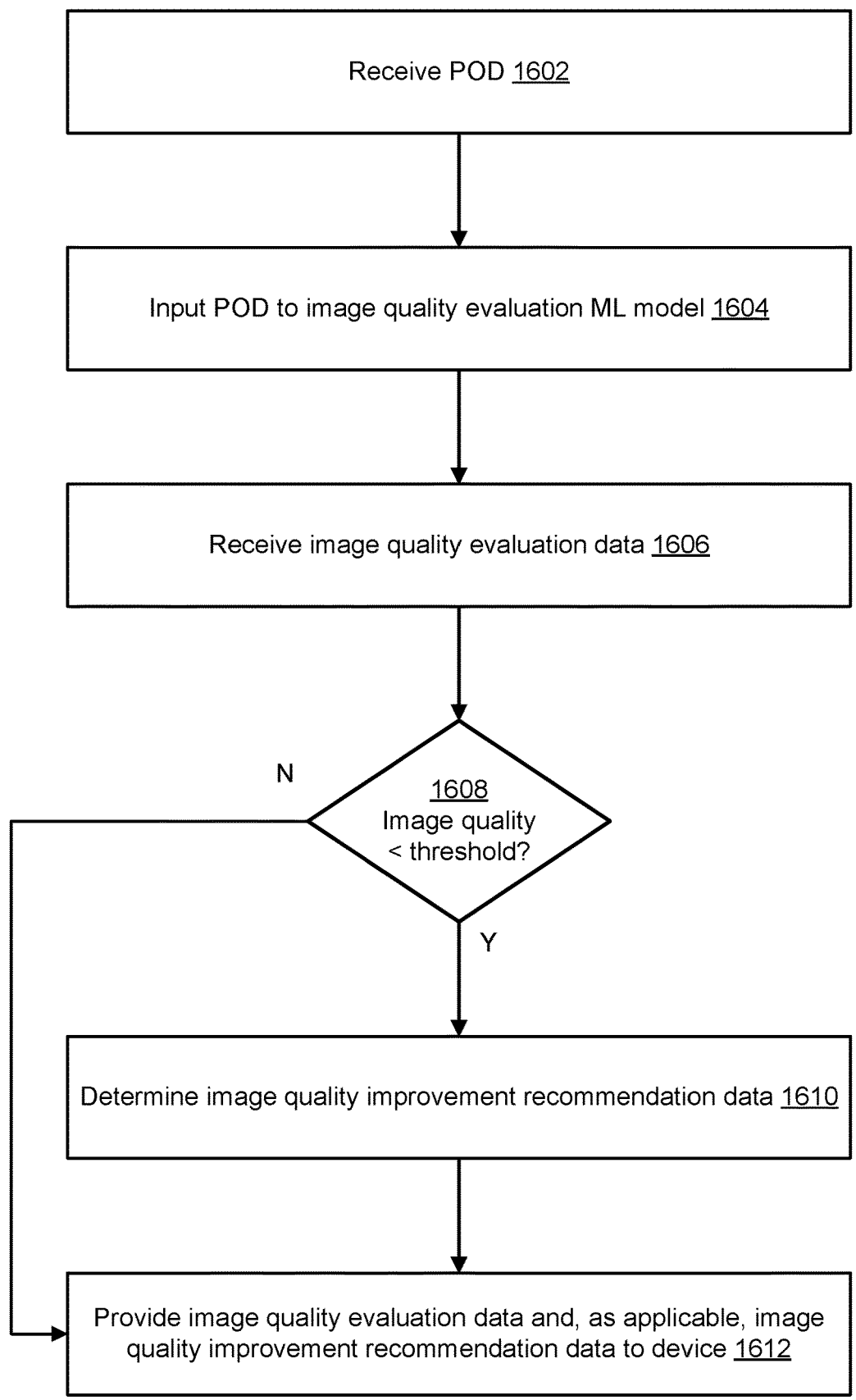
FIG. 16 illustrates an example of a flow for generating delivery image evaluation data, according to embodiments of the present disclosure.

FIG. 16 illustrates an example of a flow for generating delivery image evaluation data, according to embodiments of the present disclosure. As described below, operations of the flow can be performed by a computer system, such as the computer system 602 or the driver device 112.

In an example, the flow includes operation 1602, where the computer system receives a POD. The POD includes image data showing a drop-off of an item at a delivery location.

In an example, the flow includes operation 1604, where the computer system inputs the POD to an image quality evaluation ML model. As shown in FIG. 14 with image quality evaluation ML model 1446, the image quality evaluation ML model is trained using PODs of past deliveries to determine a quality of a POD.

In an example, the flow includes operation 1606, where the computer system receives image quality evaluation data. The image quality evaluation data includes an indication of the image quality of the POD. For example, the image quality evaluation data may include a quality score or a quantitative score for the POD.

In an example, the flow includes operation 1608, where the computer system determines whether the image quality is above a threshold. The POD is determined to be a good image quality if the image quality is above the threshold. In this case, the flow proceeds to operation 1612. Otherwise, the flow continues to operation 1610.

In an example, the flow includes operation 1610, where the computer system determines image quality improvement recommendation data. As shown in FIG. 15, a mapper, such as mapper 1530, determines the image quality improvement recommendation data. The mapper uses the image quality data and ML coefficients from the image quality evaluation ML model to determine the image quality improvement recommendation data. For example, the recommendation data may include a recommendation to hold a camera still or show a different portion of the delivery location depending on image attributes of the POD.

In an example, the flow includes operation 1612, where the computer system provides the image quality evaluation data and, as applicable, the image quality improvement recommendation data to the device. As shown in FIG. 1, the image quality evaluation data and the image quality improvement recommendation data may be provided to the device in real time during the drop-off or during a post-delivery period after the drop-off.

Figure 17:
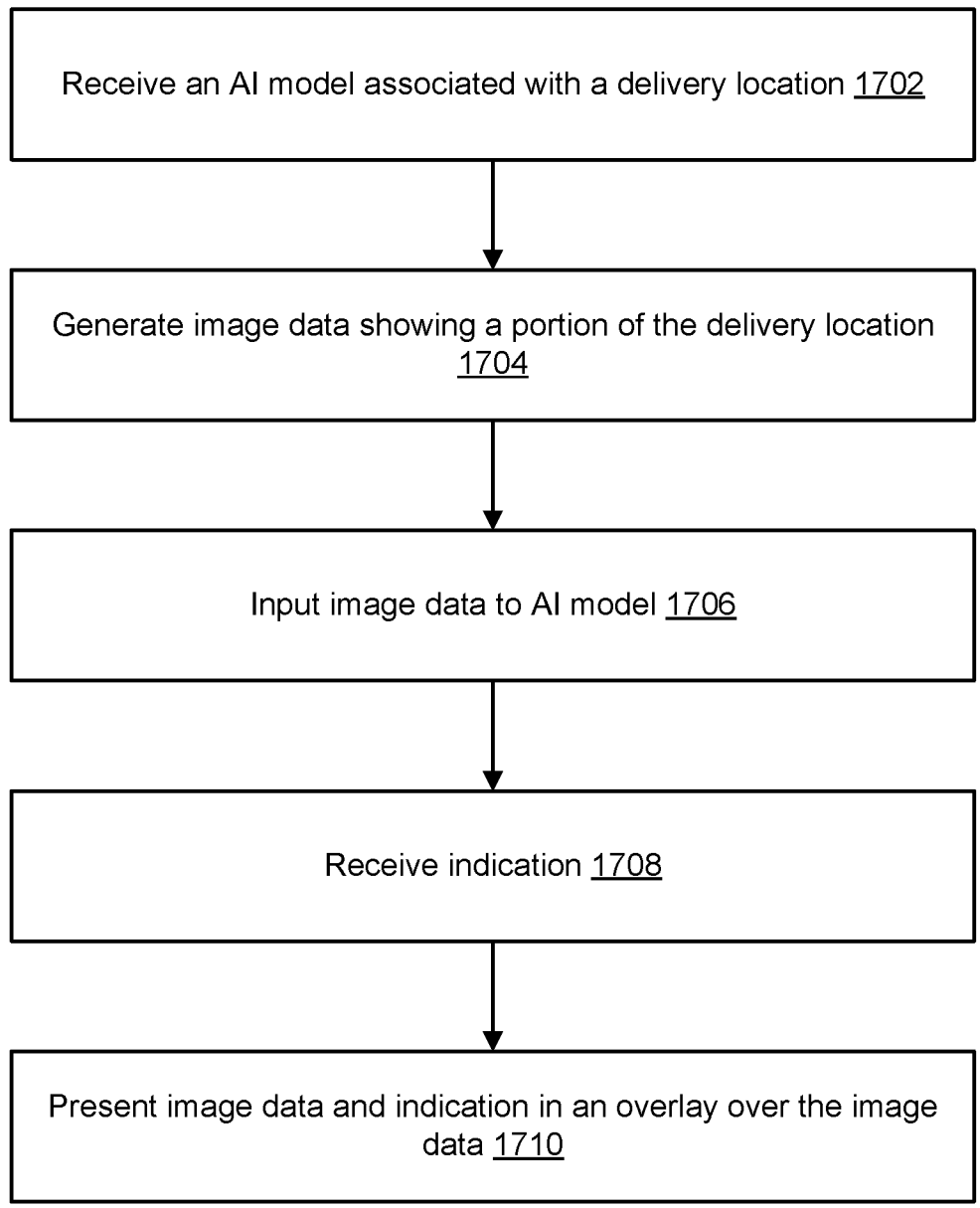
FIG. 17 illustrates an example of a flow for a device generating delivery assistance data, according to embodiments of the present disclosure.

FIG. 17 illustrates an example of a flow for a device generating delivery assistance data, according to embodiments of the present disclosure. As described below, operations of the flow can be performed by a device associated with a delivery driver, such as the driver device 112.

In an example, the flow includes operation 1702, where the device receives an AI model associated with a delivery location. As shown in FIG. 10, the AI model can be a drop-off classifier that extracts features from image data and determines whether the extracted features correspond to a correct or incorrect drop-off.

In an example, the flow includes operation 1704, where the device generates image data showing a portion of the delivery location. A camera of the device generates the image data. The image data may be generated during the drop-off and processed in real time.

In an example, the flow includes operation 1706, where the device inputs the image data to the AI model. The image data is input to the drop-off classifier, which determines, based on the extracted features, whether the portion corresponds to a correct drop-off location. Image data can be input as the camera scans the delivery location for the correct drop-off location.

In an example, the flow includes operation 1708, where the device receives an indication. The indication is received from the AI model and indicates whether the portion corresponds to the correct drop-off location.

In an example, the flow includes operation 1710, where the device presents the image data and the indication in an overlay over the image data. As shown in FIG. 3, the device may present the image data in real time as an overlay of "incorrect drop-off location" or "correct drop-off location" over the image data.

Figure 18:
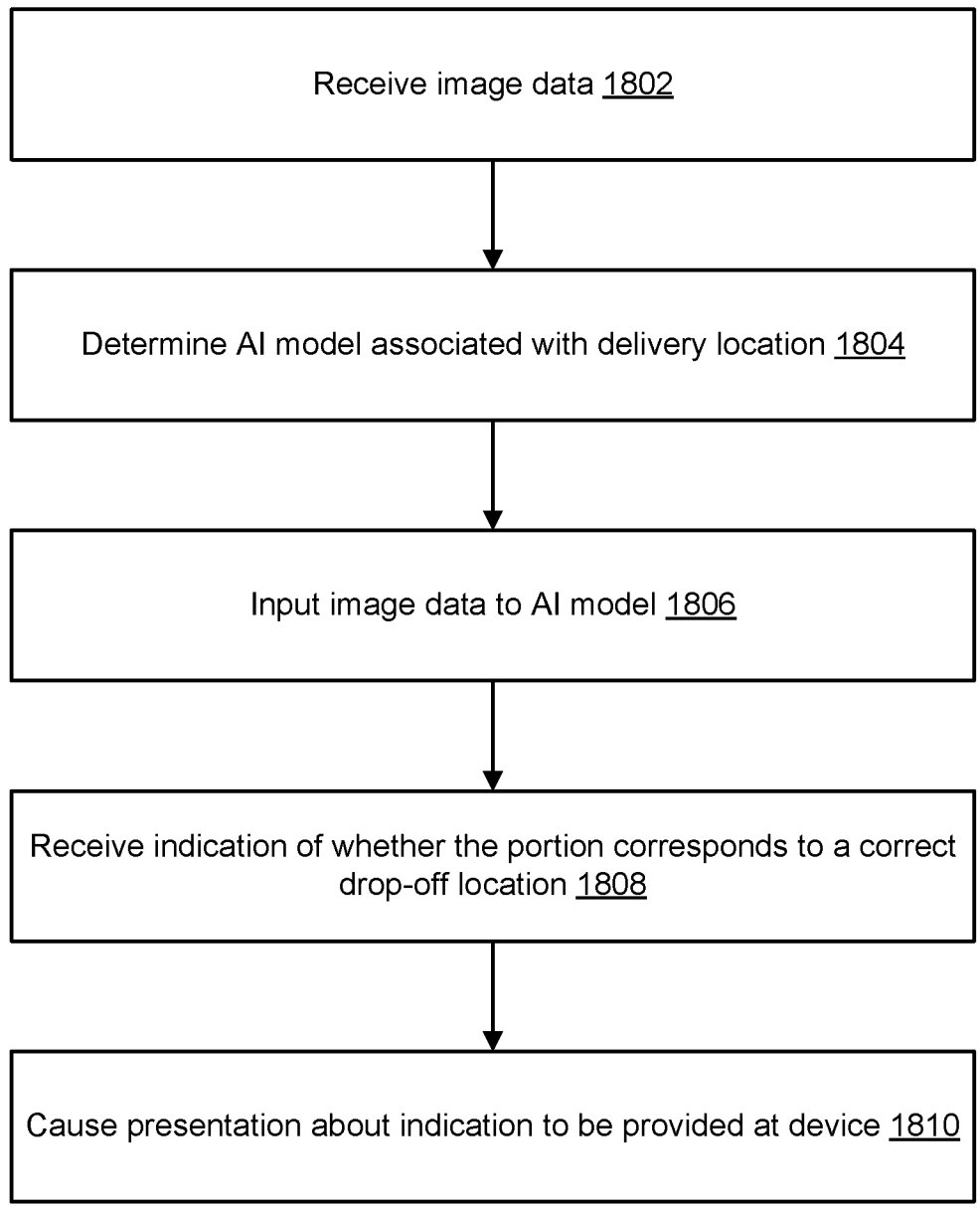
FIG. 18 illustrates an example of a flow for a system generating delivery assistance data according to embodiments of the present disclosure.

FIG. 18 illustrates an example of a flow for a system generating delivery assistance data according to embodiments of the present disclosure. As described below, operations of the flow can be performed by a computer system, such as the computer system 602 or the driver device 112.

In an example, the flow includes operation 1802, where the computer system receives image data. A camera of a device associated with the delivery generates the image data showing a portion of a delivery location, and the computer system receives the image data from the device. In some examples, the computer system is the device and the device receives the image data from the camera.

In an example, the flow includes operation 1804, where the computer system determines an AI model associated with the delivery location. The AI model is trained for the delivery location, so the computer system determines the AI model that is trained for the delivery location. As shown in FIG. 10, the AI model is a drop-off classifier that extracts features from image data and determines whether the extracted features correspond to a correct or incorrect drop-off.

In an example, the flow includes operation 1806, where the computer system inputs the image data to the AI model. The image data is input to the drop-off classifier, which determines, based on the extracted features, whether the portion corresponds to a correct drop-off location. Image data can be input as the camera scans the delivery location for the correct drop-off location. Alternatively, image data of an image can be input to the AI model after the drop-off.

In an example, the flow includes operation 1808, where the computer system receives an indication of whether the portion corresponds to a correct drop-off location. The indication is received from the AI model and indicates whether the portion corresponds to the correct drop-off location.

In an example, the flow includes operation 1810, where the computer system causes a presentation about the indication to be provided at the device. As shown in FIG. 3, the device may present the image data in real time as an overlay of "incorrect drop-off location" or "correct drop-off location" over the image data. Alternatively, the indication may be presented after the drop-off and in a post-delivery stage.

Figure 19:
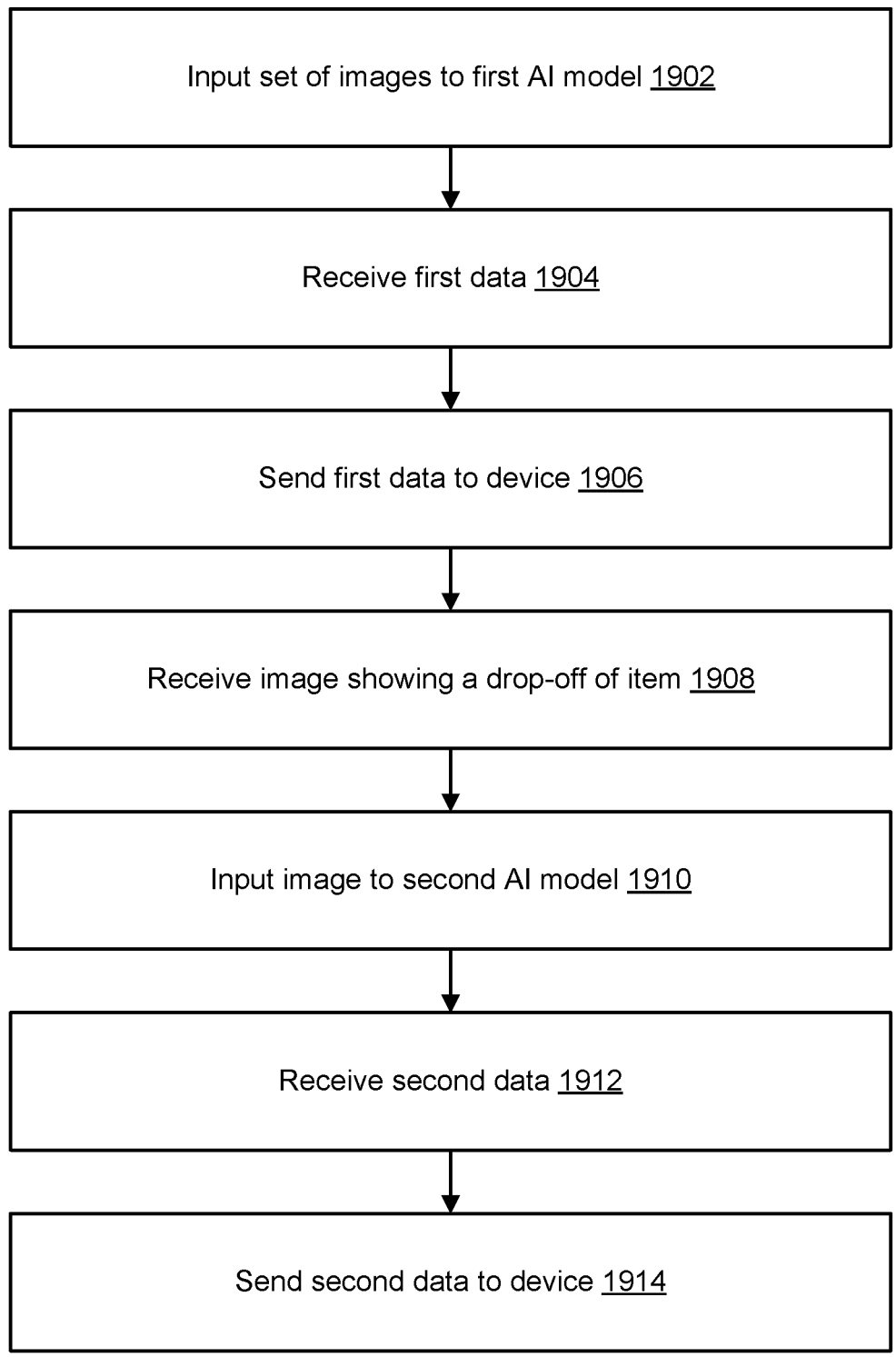
FIG. 19 illustrates an example of a flow for generating delivery notification data, according to embodiments of the present disclosure.

FIG. 19 illustrates an example of a flow for generating delivery notification data, according to embodiments of the present disclosure. As described below, operations of the flow can be performed by a computer system, such as the computer system 602 or the driver device 112.

In an example, the flow includes operation 1902, where the computer system inputs a set of images to a first AI model. The set of images show item drop-offs at a delivery location and the first AI model is trained for object detection based on training images showing historical drop-offs at multiple delivery locations. As shown in FIGS. 7 and 8, the first AI model can be an object detector ML model.

In an example, the flow includes operation 1904, where the computer system receives first data. The first data identifies objects at the delivery location, relative positioning of the objects, and a correct drop-off location at the delivery location. The computer system receives the first data from the first AI model.

In an example, the flow includes operation 1906, where the computer system sends the first data to a device. The device is associated with a delivery of an item to the delivery location. FIG. 2 shows an example of the first data being displayed on a device.

In an example, the flow includes operation 1908, where the computer system receives an image showing a drop-off of an item. The image is generated by a camera of the device.

In an example, the flow includes operation 1910, where the computer system inputs the image to a second AI model. The second AI model is trained for item drop-off classification at the delivery location based on the set of images. FIG. 10 shows an example of a drop-off classifier that may be used as the second AI model.

In an example, the flow includes operation 1912, where the computer system receives second data. The second data indicates whether the drop-off is correct. As described in FIG. 10, the second AI model can be a drop-off classifier with a feature extractor and a binary classifier.

In an example, the flow includes operation 1914, where the computer system sends the second data to the device. The second data is sent to at least one of the device or another device and is presented on a display of the device(s) to which the second data is sent. For example, the second data may be presented to the device as "the item delivered to address XYZ was dropped off at an incorrect location."

Figure 20:
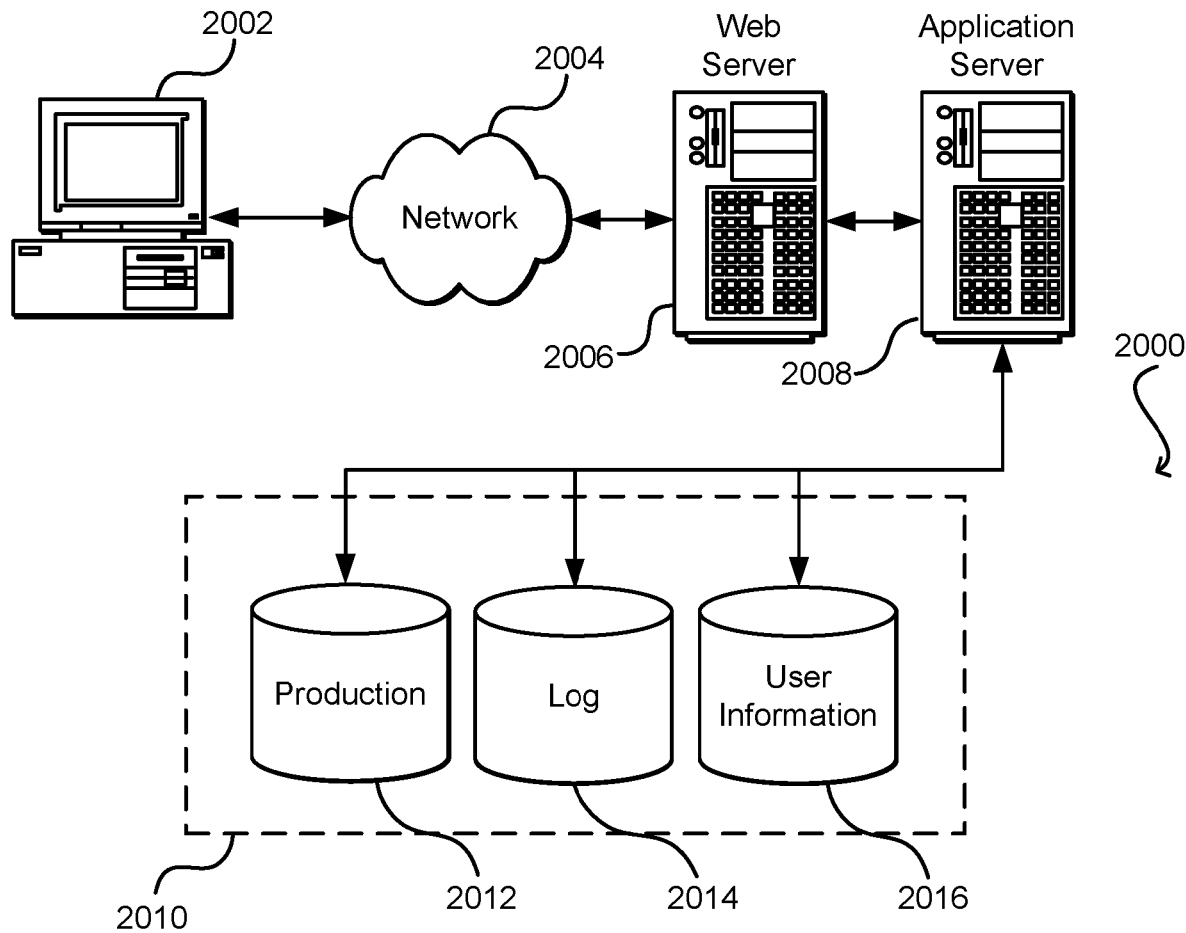
FIG. 20 illustrates an environment in which various embodiments can be implemented.

FIG. 20 illustrates aspects of an example environment 2000 for implementing aspects in accordance with various embodiments. As will be appreciated, although a Web-based environment is used for purposes of explanation, different environments may be used, as appropriate, to implement various embodiments. The environment includes an electronic client device 2002 (such as any of the multimedia devices described herein above), which can include any appropriate device operable to send and receive requests, messages, or information over an appropriate network 2004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2006 for receiving requests and serving content in response thereto, although for other networks an alternative device serving a similar purpose could be used as would be apparent to one of ordinary skill in the art.

The illustrative environment includes at least one application server 2008 and a data store 2010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2002 and the application server 2008, can be handled by the Web server. It should be understood that the Web and application servers are not required and are merely example components, as structured code discussed herein can be executed on any appropriate device or host machine as discussed elsewhere herein.

The data store 2010 can include several separate data tables, databases or other data storage mechanisms and media for storing data relating to a particular aspect. For example, the data store illustrated includes mechanisms for storing production data 2012 and user information 2016, which can be used to serve content for the production side. The data store also is shown to include a mechanism for storing log data 2014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2010. The data store 2010 is operable, through logic associated therewith, to receive instructions from the application server 2008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 2002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the system 2000 in FIG. 20 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN")

familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a computer system, cause the computer system to perform operations comprising:
    inputting, to a first artificial intelligence (AI) model, a set of images showing item drop-offs at a delivery location, the first AI model trained for object detection based at least in part on training images showing historical item drop-offs at a plurality of delivery locations;

receiving, from the first AI model, first data that identifies objects at the delivery location, relative positioning of the objects, and a correct drop-off location, the first data comprising a label that identifies a first object, a first indication of a location of the first object relative to a second object at the delivery location, and a second indication of the correct drop-off location; and causing, by at least sending the first data to a device associated with a delivery of an item to the delivery location, the device to present the label, the first indication, and the second indication at a user interface of the device.

2. The one or more non-transitory computer-readable storage media of claim 1, wherein the one or more non-transitory computer-readable storage media store further instructions that, upon execution on the computer system, cause the computer system to perform additional operations comprising:

inputting, to the first AI model, environmental data associated with the delivery location;

receiving, from the first AI model, second data that comprises a safety warning associated with the correct drop-off location; and causing, by at least sending the second data to the device, the device to present the safety warning at the user interface in conjunction with presenting the label, the first indication, and the second indication.

3. The one or more non-transitory computer-readable storage media of claim 1, wherein the one or more non-transitory computer-readable storage media store further instructions that, upon execution on the computer system, cause the computer system to perform additional operations comprising:

inputting, to a second AI model, the first data and environmental data associated with the delivery location, the second AI model trained for safety warning recommendations based at least in part on training data that indicates detected objects at the plurality of delivery locations and environmental conditions associated with the plurality of delivery locations;

receiving, from the second AI model, second data that comprises a safety warning associated with the correct drop-off location; and sending the second data to the device.

4. The one or more non-transitory computer-readable storage media of claim 1, wherein the one or more non-transitory computer-readable storage media store further instructions that, upon execution on the computer system, cause the computer system to perform additional operations comprising:

receiving, from the device, an image showing a drop-off of the item;

inputting, to a multi-class classifier, the image based at least in part on second data indicating an incorrect item drop-off, wherein the multi-class classifier is trained based at least in part on (i) the set of images and (ii) additional images showing at least one of: drop-offs at one or more delivery locations within a distance range of the delivery location or other drop-offs at random delivery locations;

receiving, from the multi-class classifier, third data indicating at least one of: a second delivery location that corresponds to the incorrect item drop-off or an incorrect delivery at an unknown location; and sending, to at least one of the device or another device, the third data, the third data presented on a display of the at least one of the device or the other device.

5. A method implemented on a computer system, the method comprising:

inputting, to a first artificial intelligence (AI) model, a set of images showing item drop-offs at a delivery location, the first AI model trained for object detection based at least in part on training images;

receiving, from the first AI model, first data that identifies objects at the delivery location, relative positioning of the objects, and a correct drop-off location, the first data comprising a label that identifies a first object, a first indication of a location of the first object relative to a second object at the delivery location, and a second indication of the correct drop-off location; and causing, by at least providing the first data to a device associated with a delivery of an item to the delivery location, the device to present the label, the first indication, and the second indication at a user interface of the device.

6. The method of claim 5, further comprising:

receiving, from the device, an image showing a drop-off of the item;

inputting the image to a second AI model, the second AI model trained for item drop-off classification at the delivery location based at least in part on the set of images;

receiving, from the second AI model, second data indicating whether the drop-off is correct; and sending, to at least one of the device or another device, the second data, the second data presented on a display of the at least one of the device or the other device.

7. The method of claim 5, further comprising:

generating a labeled image from an image of the set of images, the labeled image showing the objects and comprising a first bounding box around the first object and the label associated with the first bounding box, wherein the first indication comprises the first bounding box; and sending the labeled image to the device, wherein the labeled image is presented at the user interface.

8. The method of claim 7, wherein the labeled image further comprises a second bounding box around the correct drop-off location.

9. The method of claim 5, further comprising:

determining environmental data associated with the delivery location;

generating, based at least in part on the environmental data and the first data, second data that comprises a safety warning associated with the delivery of the item; and sending the second data to the device.

10. The method of claim 9, wherein generating the second data comprises at least one of:

inputting the environmental data to the first AI model; or inputting the environmental data and the first data to a second AI model trained for safety warning recommendations.

11. The method of claim 5, further comprising:

determining environmental data associated with the delivery location; and determining, based at least in part on the set of images and the environmental data, the correct drop-off location.

12. The method of claim 11, wherein determining the correct drop-off location comprises inputting the environmental data to the first AI model.

13. The method of claim 5, wherein determining the correct drop-off location further comprises inputting, to the first AI model, item data identifying one or more attributes of the item.

14. A computer system comprising:
one or more processors; and
one or more memories storing computer-readable instructions that, upon execution by the one or more processors, configure the computer system to:
input, to a first artificial intelligence (AI) model, a set of images showing item drop-offs at a delivery location, the first AI model trained for object detection based at least in part on training images showing historical item drop-offs at a plurality of delivery locations;
receive, from the first AI model, first data that identifies objects at the delivery location, relative positioning of the objects, and a correct drop-off location, the first data comprising a label that identifies a first object, a first indication of a location of the first object relative to a second object at the delivery location, and a second indication of the correct drop-off location; and
cause, by at least sending the first data to a device associated with a delivery of an item to the delivery location, the device to present the label, the first indication, and the second indication at a user interface of the device.

15. The computer system of claim 14, wherein the one or more memories store further computer-readable instructions that, upon execution by the one or more processors, additionally configure the computer system to:
receive, from the device, an image showing a drop-off of the item;
input the image to a second AI model, the second AI model trained for item drop-off classification based at least in part on the set of images;
receive, from the second AI model, second data comprising a third indication of whether the drop-off is correct; and
cause a presentation of the third indication at the device.

16. The computer system of claim 15, wherein the first AI model comprises a machine learning (ML) model that is trained for feature extraction based at least in part on the training images, and wherein the second AI model comprises a classifier that is trained for drop-off classifications.

17. The computer system of claim 16, wherein inputting the image comprises:
inputting the image to the ML model;
receiving features extracted by the ML model based at least in part on the image;
inputting the features to the classifier; and
receiving the third indication from the classifier based at least in part on the features.

18. The computer system of claim 15, wherein the second AI model comprises a multi-class classifier that is trained for delivery location prediction based at least in part on (i) the set of images and (ii) additional images showing other drop-offs at one or more other delivery locations within a distance range of the delivery location.

19. The computer system of claim 14, wherein the one or more memories store additional computer-readable instructions that, upon execution by the one or more processors, further configure the computer system to:
input an image to a second AI model, the second AI model trained for drop-off image quality evaluation based at least in part on the training images;
receive, from the second AI model and based at least in part on the image, an image quality evaluation; and
send, to the device, second data that comprises the image quality evaluation.

20. The computer system of claim 19, wherein the second AI model is further trained for image quality improvement based at least in part on an image attribute, the image attribute comprising at least one of: blurriness, brightness, angle relative to an item drop-off, relative location of the item drop-off in the image, or contextual background around the item drop-off, and wherein the one or more memories store further computer-readable instructions that, upon execution by the one or more processors, additionally configure the computer system to:
receive, from the second AI model and based at least in part on the image, a recommendation about an image quality improvement, wherein the second data comprises the recommendation.

* * * * *